United States Patent

Jun et al.

(10) Patent No.: US 10,802,654 B2
(45) Date of Patent: Oct. 13, 2020

(54) TOUCH DISPLAY DEVICE, DRIVING CIRCUIT, AND DRIVING METHOD

(71) Applicant: LG Display Co., Ltd., Seoul (KR)

(72) Inventors: Jaehun Jun, Seoul (KR); HyeongWon Kang, Seoul (KR); Youngwoo Jo, Paju-si (KR)

(73) Assignee: LG Display Co., Ltd., Seoul (KR)

(*) Notice: Subject to any disclaimer, the term of this patent is extended or adjusted under 35 U.S.C. 154(b) by 100 days.

(21) Appl. No.: 16/163,571

(22) Filed: Oct. 18, 2018

(65) Prior Publication Data

US 2019/0121468 A1   Apr. 25, 2019

(30) Foreign Application Priority Data

Oct. 24, 2017  (KR) .................. 10-2017-0138717

(51) Int. Cl.
*G06F 3/044* (2006.01)
*G06F 3/041* (2006.01)
*G02F 1/1333* (2006.01)
*G06F 3/045* (2006.01)

(52) U.S. Cl.
CPC .......... *G06F 3/044* (2013.01); *G02F 1/13338* (2013.01); *G06F 3/045* (2013.01); *G06F 3/0412* (2013.01); *G06F 3/0418* (2013.01); *G06F 3/0443* (2019.05); *G06F 3/04166* (2019.05); *G06F 3/04184* (2019.05)

(58) Field of Classification Search
CPC .... G06F 3/044; G06F 3/04166; G06F 3/0443; G06F 3/0412; G06F 3/0418; G06F 3/045; G06F 3/04184; G02F 1/1338
See application file for complete search history.

(56) References Cited

U.S. PATENT DOCUMENTS

| | | | |
|---|---|---|---|
| 2013/0050144 A1* | 2/2013 | Reynolds | G06F 3/0416 345/174 |
| 2014/0049486 A1 | 2/2014 | Kim et al. | |
| 2014/0062935 A1 | 3/2014 | Bi | |
| 2015/0332638 A1* | 11/2015 | Li | G09G 3/3655 345/214 |
| 2016/0370922 A1 | 12/2016 | Fan et al. | |
| 2017/0212626 A1 | 7/2017 | Zhao | |

OTHER PUBLICATIONS

Combined Search and Examination Report, United Kingdom Patent Application No. GB1816916.9, dated Mar. 29, 2019, 5 pages.

* cited by examiner

*Primary Examiner* — Parul H Gupta
(74) *Attorney, Agent, or Firm* — Fenwick & West LLP

(57) ABSTRACT

A touch display device includes a display panel having a plurality of data lines, gate lines, and common electrodes, a data driving circuit supplying a data signal to the data lines, a common electrode driving circuit supplying a common signal to the common electrodes and outputting sensing data by detecting sensing signals from one or more of the common electrodes, and a touch controller sensing touch based on the sensing data, in which the common electrodes are arranged in two or more common electrode columns, the two or more common electrode columns each include two or more common electrodes, and while the data signal is supplied to the data lines, the two or more common electrode columns are supplied with a common signal respectively through local buffers. It is possible to perform touch sensing even while display driving by removing noise due to display driving.

15 Claims, 20 Drawing Sheets

TOUCH DISPLAY DEVICE, DRIVING CIRCUIT, AND DRIVING METHOD

CROSS REFERENCE TO RELATED APPLICATION

This application claims priority to Republic of Korea Patent Application No. 10-2017-0138717, filed on Oct. 24, 2017, which is incorporated herein by reference in its entirety.

BACKGROUND

1. Related Field

The present disclosure relates to a touch display device, a driving circuit, and a driving method.

2. Description of the Prior Art

With the development of an information-based society, demand for display devices for displaying images increases in various ways, and recently, various display devices such as a liquid crystal display, a plasma display, and an organic light emitting display have been used.

In these display devices, there is a touch display device that provides a touch-based input method that allows a user to intuitively and conveniently input information or instructions beyond the common input methods such as buttons, a keyboard, and a mouse.

Such a touch display device is designed to provide both functions for displaying images and sensing touch. It divides a driving time such as a frame time into a display driving period and a touch driving period, and performs display driving in the display driving period and performs touch driving and touch sensing in the touch driving period after the display driving period.

In order to time-divisionally perform the display driving and the touch driving with the time-division driving method, very precise timing control is required and expensive parts may be needed for this control.

Further, there is a problem with the time-division driving method such that the display driving time and the touch driving time may be both insufficient, deteriorating both the image quality and the touch sensitivity. In particular, it is problematic that high-resolution image quality cannot be provided due to the time-division driving.

Meanwhile, there is another problem with the touch sensitivity considerably deteriorating due to display driving in touch display devices of the related art.

SUMMARY

In this background, an aspect of the present disclosure is to provide a touch display device, a driving circuit, and a driving method that prevent deterioration of touch sensitivity due to display driving.

Another aspect of the present disclosure is to provide a touch display device, a driving circuit, and a driving method that can reduce noise due to a display change (e.g., a change in data voltage).

Another aspect of the present disclosure is to provide a touch display device, a driving circuit, and a driving method that prevent noise due to a display change (e.g., a change in data voltage) generated in touch electrode columns from influencing each other.

Another aspect of the present disclosure is to provide a touch display device, a driving circuit, and a driving method that can simultaneously perform display driving and touch driving.

In accordance with an aspect of the present disclosure, a provided touch display device includes: a display panel having a plurality of data lines and a plurality of gate lines, and a plurality of common electrodes arranged in at least M rows and N columns; a data driving circuit supplying a data signal to the data lines; a common electrode driving circuit supplying a common signal to the common electrodes and outputting sensing data by detecting sensing signals from one or more of the common electrodes; and a touch controller sensing touch on a basis of the sensing data.

In the touch display device, the common electrodes disposed on the display panel may be arranged in N (N is a natural number of 2 or more) common electrode columns and the N common electrode columns each may include M (M is a natural number of 2 or more) common electrodes.

While the data signal is supplied to the data lines, the N common electrode columns may be supplied with the common signal respectively through local buffers.

The N common electrode columns may include a first common electrode column and a second common electrode column and the local buffers comprise a first local buffer corresponding to the first common electrode column and a second local buffer corresponding to the second common electrode column.

The common electrode driving circuit includes: a pre-amplifier supplying a common signal output from the first local buffer to one common electrode of the M common electrodes included in the first common electrode column, and receiving a sensing signal from the one common electrode; and a multiplexer supplying the common signal output from the first local buffer to other common electrodes except for the one common electrode of the M common electrodes included in the first common electrode column.

Primary ground voltage may be applied to the touch controller, and secondary ground voltage different from the primary ground voltage may be applied to the display panel, the data driving circuit, and the common electrode driving circuit.

The secondary ground voltage and the common signal may be a modulated signal, compared to the primary ground voltage.

The secondary ground voltage and the common signal may be a modulated signal corresponding to each other in one or more of frequency, phase, voltage polarity, and amplitude.

In accordance with another aspect of the present disclosure, a provided driving circuit is configured to drive a display panel that has a plurality of data lines and a plurality of gate lines, and a plurality of common electrodes arranged in at least M rows and N columns and in which N (N is a natural number of 2 or more) common electrode columns constituting the common electrodes each include M (M is a natural number of 2 or more) common electrodes.

The driving circuit may include: a data driving circuit supplying data signal to the data lines; and a common electrode driving circuit supplying a common signal to the common electrodes and outputting sensing data by detecting sensing signals from one or more of the common electrodes.

While the data signal is supplied to the data lines, the N common electrode columns may be supplied with a common signal respectively through local buffers by the driving circuit.

In accordance with another aspect of the present disclosure, a provided touch display device comprising: a display panel (a touch panel disposed inside or outside a display panel) having a plurality of touch electrodes arranged in at least M rows and N columns; a driving circuit supplying a touch driving signal to the touch electrodes and outputting sensing data by detecting sensing signals from one or more of the touch electrodes: and a touch controller sensing touch on a basis of the sensing data.

In the touch display device, the touch electrodes disposed on the display panel may be arranged in N (N is a natural number of 2 or more) touch electrode columns and the N touch electrode columns each may include M (M is a natural number of 2 or more) touch electrodes.

The N touch electrode columns may be supplied with a driving signal through respectively local buffers.

In accordance with another aspect of the present disclosure, a provided method of driving a touch display device includes a display panel having a plurality of data lines and a plurality of gate lines, and a plurality of common electrodes arranged in at least M rows and N columns.

The method may include: supplying a data signal to the data lines and supplying a common signal to the common electrodes; and sensing touch by detecting sensing signals from one or more of the common electrodes while an image is displayed.

The common electrodes disposed on the display panel may be arranged in N (N is a natural number of 2 or more) common electrode columns and the N common electrode columns each may include M (M is a natural number of 2 or more) common electrodes.

While the data signal is supplied to the data lines, the N common electrode columns may be supplied with the common signal respectively through local buffers.

According to the present disclosure, it is possible to provide a touch display device, a driving circuit, and a driving method that prevent deterioration of touch sensitivity due to display driving.

According to the present disclosure, it is possible to provide a touch display device, a driving circuit, and a driving method that can reduce noise due to a display change (e.g., a change in data voltage).

According to the present disclosure, it is possible to provide a touch display device, a driving circuit, and a driving method that prevent noise due to a display change (e.g., a change in data voltage) generated in touch electrode columns from influencing each other.

According to the present disclosure, as described above, it is possible to provide a touch display device, a driving circuit, and a driving method that can simultaneously perform display driving and touch driving.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
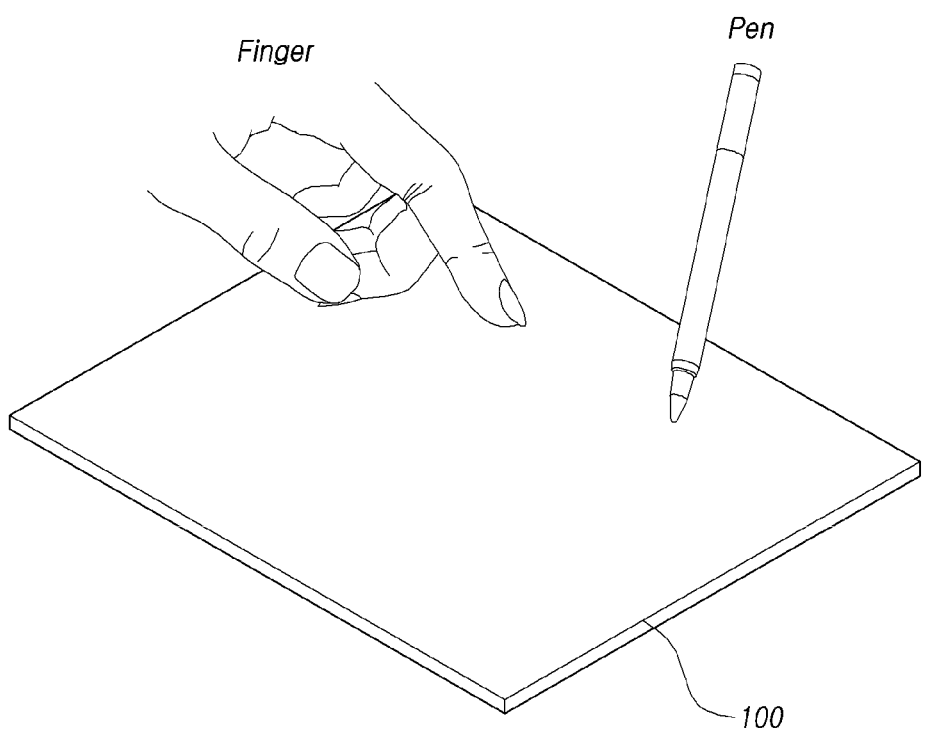
FIG. 1 is a diagram showing a touch display device according to an embodiment of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram showing a touch display device 100 according to an embodiment of the present disclosure.

The touch display device 100 according to an embodiment of the present disclosure can provide not only an image display function that displays images, but a touch sensing function that senses touch by fingers and/or pens.

The 'pen' stated herein may include an active pen that has a signal transmission/reception function, or can operate with the touch display device 100, or includes a power source therein and a passive pen that does not have a signal transmission/reception function and a power source therein.

The touch display device 100 according to an embodiment of the present disclosure, for example, may be a television (TV) or a monitor and may be a mobile device such as a tablet PC or a smartphone.

The touch display device 100 according to an embodiment of the present disclosure may include a display part for providing an image display function and a touch sensing part for touch sensing.

Figure 2:
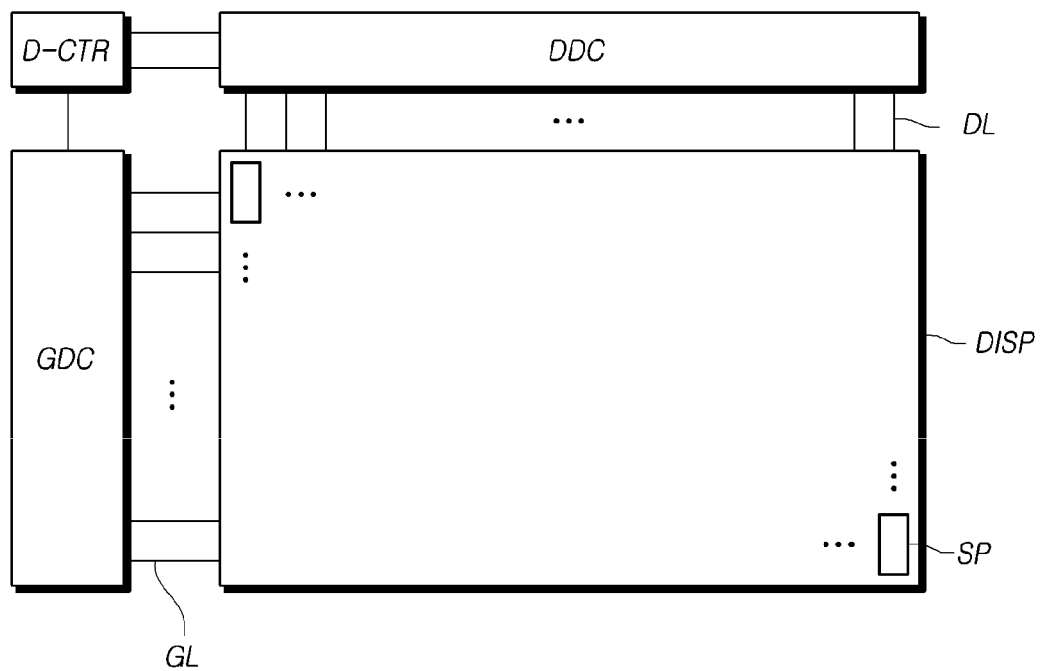
FIG. 2 is a diagram showing a display part in the touch display device according to an embodiment of the present disclosure.
Figure 3:
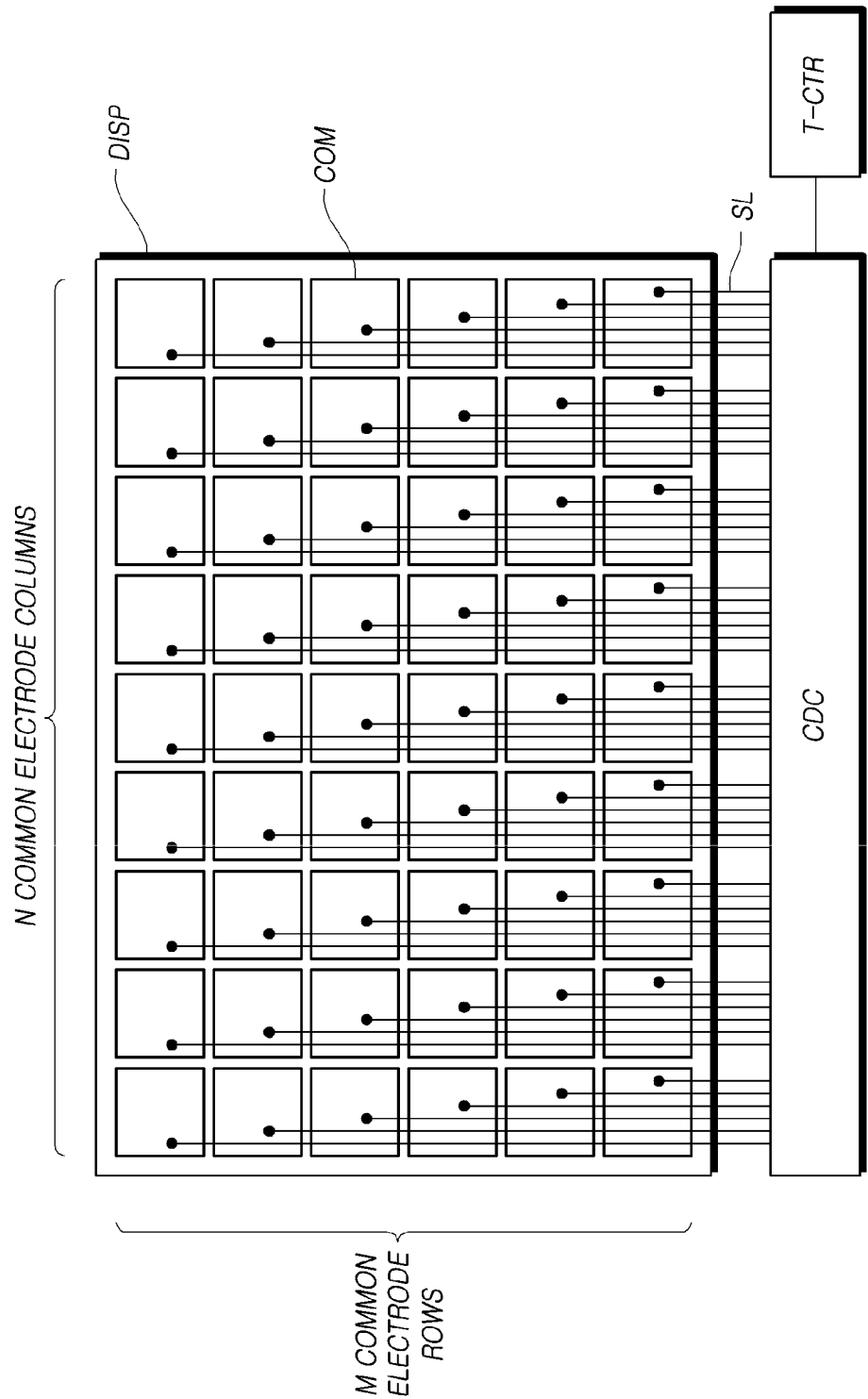
FIG. 3 is a diagram showing a touch sensing part in the touch display device according to an embodiment of the present disclosure.

The structures of the display part and the touch sensing part of the touch display device 100 are described hereafter briefly with reference to FIGS. 2 and 3.

FIG. 2 is a diagram showing the display part in the touch display device 100 according to an embodiment of the present disclosure.

Referring to FIG. 2, the display part of the touch display device 100 according to an embodiment of the present disclosure may include a display panel DISP, a data driving circuit DDC, a gate driving circuit GDC, a display controller D-CTR, etc.

On the display panel DISP, a plurality of data lines DL and a plurality of gate lines GL are disposed, and a plurality of subpixels SP are defined by the data lines DL and the gate lines GL.

The data driving circuit DDC drives the data lines DL by supplying data voltage to the data lines DL.

The gate driving circuit GDC drives the gate lines GL by sequentially supplying scan signals to the gate lines GL.

The display controller D-CTR controls the operation of the data driving circuit DDC and the gate driving circuit GDC by supplying various control signals DCS and GCS to the data driving circuit DDC and the gate driving circuit GDC.

The display controller D-CTR starts scanning in accordance with the timing implemented in each frame, outputs converted image data by converting input image data received from the outside to fit the data signal format that is used by the data driving circuit DDC, and controls data driving at a predetermined time in accordance with scanning.

The display controller D-CTR may be a timing controller (TCON) that is generally used for displaying or a controller including the timing controller and performing other control functions.

The display controller D-CTR may be implemented as a part separated from the data driving circuit DDC or may be implemented in an integrated circuit with the data driving circuit DDC.

The data driving circuit DDC may include one or more source driver integrated circuits.

The source driver integrated circuits may each include a shift register, a latch circuit, a digital analog converter (DAC), an output buffer, etc.

The source driver integrated circuits, depending on cases, each may further include an analog-to-digital converter (ADC).

The gate driving circuit GDC may include one or more gate driver integrated circuits.

The gate driver integrated circuits each may include a shift register and a level shifter.

The data driving circuit DDC may be disposed only at a side (e.g., over or under) from the display panel DISP, or, in some cases, it may be disposed at two sides (e.g., over and under) from the display panel DISP, depending on the driving method, the panel design method, etc.

The gate driving circuit GDC may be disposed only at a side of (e.g., left or, right of, over, or under) the display panel DISP, or, in some cases, it may be disposed at two sides of (e.g., left and right of) the display panel DISP, depending on the driving method, the panel design method, etc.

The display panel DISP may be various types of display panels such as a liquid crystal display panel, an organic light emitting display panel, or a plasma display panel.

Figure 4:
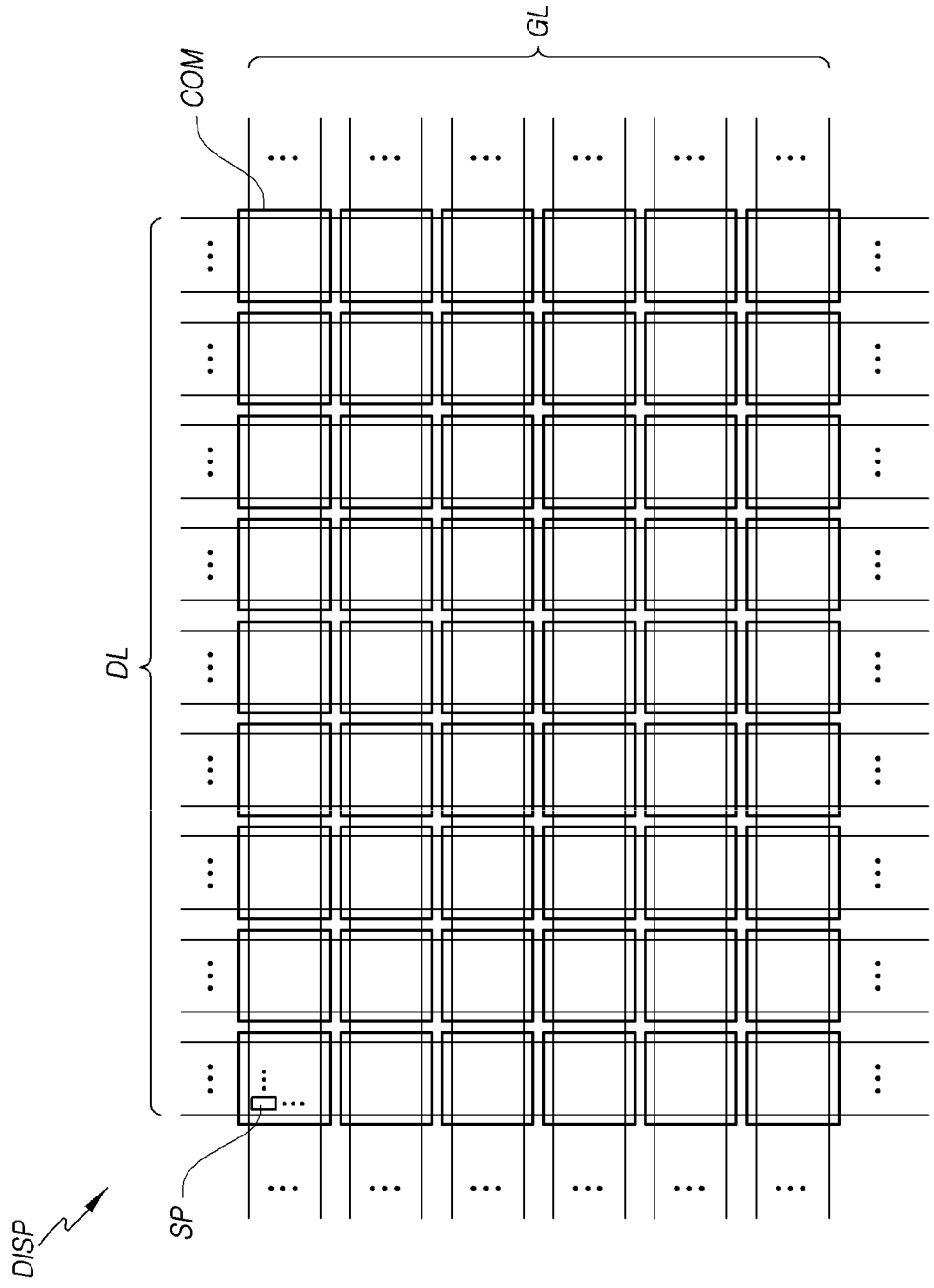
FIG. 4 is a diagram showing a display panel in the touch display device according to an embodiment of the present disclosure.

FIG. 3 is a diagram showing the touch sensing part in the touch display device 100 according to an embodiment of the present disclosure. FIG. 4 is a diagram showing the display panel DISP in the touch display device 100 according to an embodiment of the present disclosure, in which the relationships between data lines DL, gate lines GL, and common electrodes COM on the display panel DISP are shown.

As shown in FIG. 3, the touch display device 100 according to an embodiment of the present disclosure needs a touch panel and a touch circuit that senses touch by driving the touch panel in order to sense touch input by a finger and/or a pen.

In the touch display device 100 according to an embodiment of the present disclosure, the touch panel may be disposed outside or inside the display panel DISP.

When the touch panel is disposed inside the display panel DISP, it may be an in-cell type or an on-cell type.

The fact that the touch panel is disposed inside the display panel DISP in the touch display device 100 according to an embodiment of the present disclosure means that touch electrodes are disposed in the display panel DISP.

In this case, a plurality of common electrodes COM that function as touch electrodes may be formed with electrodes or signal lines for display driving when the display panel DISP is manufactured.

It is assumed in the following description that touch electrodes are disposed in the display panel DISP and are common electrodes COM.

On the display panel DISP of the touch display device 100 according to an embodiment of the present disclosure, a plurality of common electrodes COM may be arranged in M rows and N columns. N and M are natural numbers of 2 or more. In addition to the common electrodes COM in the M rows and N columns, other common electrodes may be additionally disposed outside or in the edge area of the display panel.

Accordingly, N columns of common electrodes and M rows of common electrodes may exist on the display panel DISP. That is, the common electrodes COM on the display panel DISP may have N columns of common electrodes. The N columns of common electrodes each may include M common electrodes.

In the touch display device 100 according to an embodiment of the present disclosure, the touch circuit may include a common electrode driving circuit CDC that supplies a common signal SCOM to the common electrodes COM and outputs sensing data by detecting sensing signals from one or more of the common electrodes COM, a touch controller T-CTR that senses touch on the basis of the sensing data output from the common electrode driving circuit CDC, etc.

The touch display device 100 can provide a self-capacitance-based touch sensing function that senses touch by measuring capacitance or a change of capacitance in the common electrodes COM. In this case, the common electrodes COM can receive a touch driving signal and sense a touch sensing signal.

However, the touch display device 100 can provide a mutual-capacitance-based touch sensing function that senses touch by measuring capacitance or a change of capacitance among the common electrodes COM.

Referring to FIG. 3, the common electrodes COM each may be electrically connected to the common electrode driving circuit CDC through one or more signal lines SL.

A first common electrode and a second common electrode in the same column are exemplified to describe the structure of the common electrodes COM and the signal lines SL.

A first signal line connected to the first common electrode overlaps the second common electrodes, but it can be insulated from the second common electrode in a touch screen panel.

A second signal line connected to the second common electrode can be insulated from the first signal line in the touch screen panel.

The shape of one common electrode COM shown in FIGS. 3 and 4 is only an example and it may be designed in various ways.

The size of the area where one common electrode COM is formed may correspond to the size of the area where one subpixel is formed.

Alternatively, as shown in FIG. 4, the size of the area where one common electrode COM is formed may be larger than the size of the area where one subpixel is formed.

In this case, one common electrode COM may overlap two or more data lines DL and two or more gate lines GL.

According to the arrangement of a first common electrode and a second common electrode disposed in the same column of a plurality of common electrodes, the first common electrode overlaps two or more data lines and two or more gate lines and the second common electrode overlaps two or more data lines and two or more gate lines.

The two or more data lines overlapping the first common electrode and the two or more data lines overlapping the second common electrode may be the same. The two or more gate lines overlapping the first common electrode and the two or more gate lines overlapping the second common electrode may be different from each other.

According to the arrangement of a third common electrode and a fourth common electrode disposed in the same row of a plurality of common electrodes, the third common electrode overlaps two or more data lines and two or more gate lines and the fourth common electrodes overlaps two or more data lines and two or more gate lines.

The two or more data lines overlapping the third common electrode and the two or more data lines overlapping the fourth common electrode may be different from each other. The two or more gate lines overlapping the third common electrode and the two or more gate lines overlapping the fourth common electrode may be the same.

When the area where one common electrode COM is formed is large, it may correspond to the size of the areas of several or tens of subpixels.

Furthermore, as described above, the touch circuit, as shown in FIG. 3, may include one or more common electrode driving circuits CDC that supply a touch driving signal (hereafter, a common signal SCOM corresponds to the touch driving signal) to the display panel DISP and detect (receive) a touch sensing signal from the display panel DISP, a touch controller T-CTR that finds out whether there is touch input and/or the location of touch, using the touch sensing signal detection result by the common electrode driving circuits CDC, etc.

The common electrode driving circuits CDC and the touch controller T-CTR may be implemented in separate parts or in a single part.

The common electrode driving circuit CDC may be a read out integrated circuit (ROIC) and the touch controller T-CTR may be a micro control unit (MCU).

The common electrode driving circuit CDC and the touch controller T-CTR may be implemented in a combined driving circuit SRIC that is an integrated circuit.

The touch display device 100 may include one or more combined driving circuits SRIC. The combined driving circuits SRIC each may include one or more common electrode driving circuits CDC and one or more data driving circuits DDC (see FIG. 8).

As described above, by integrating a common electrode driving circuit CDC for touch driving an a data driving circuit DDC for data driving, touch driving and data driving can be effectively performed when the touch screen panel is disposed inside the display panel DISP and the signal lines SL connected to the common electrodes COM are arranged in parallel with the data lines DL.

The common electrodes COM disposed as touch electrodes (touch sensors) on the display panel DISP can be formed in various ways.

When the touch display device 100 is a liquid crystal display, the common electrodes COM may be electrodes that form an electric field with a pixel electrode in each subpixel and are also used for display driving.

For example, when display driving for image display and touch driving for touch sensing are time-divisionally performed, the common electrodes may be blocked common electrodes that receive touch driving signals or sense touch sensing signals during a touch driving period and receive common voltage during a display driving period. During the display driving period, the common electrodes COM all can be electrically connected and can commonly receive common voltage in the common electrode driving circuit CDC. Further, during the touch driving period, some or all of the common electrodes COM can be selected in the common electrode driving circuit CDC, the selected one or more common electrodes COM can receive a touch driving signal from the common electrode driving circuit CDC, or a touch sensing signal can be detected by the common electrode driving circuit CDC.

Alternatively, when the display driving for image display and the touch driving for touch sensing are simultaneously performed, touch driving signals that are applied to a first common electrode and a second common electrode may be voltages that generate capacitance with data voltage, which are supplied to two or more subpixels overlapping the first common electrode, and also voltage that generate capacitance with data voltage that are supplied to the two or more subpixels overlapping the second common electrode.

The common electrodes COM may each have a plurality of slits (also called holes) to form an electric field with the pixel electrode in the overlapping subpixels.

When the touch display device 100 is an organic light emitting display, the common electrodes COM and the signal lines SL may be disposed on an encapsulation layer of the display panel DISP. The encapsulation layer is disposed on the front of the display panel DISP and may be disposed on the common electrodes (e.g., cathode electrodes) to which common voltage is applied.

The common electrodes disposed on the front of the display panel DISP, for example, may be cathode electrode among anode electrodes (corresponding to pixel electrodes) and cathode electrodes of OLEDs (Organic Light Emitting Diode) in the subpixels, and the common voltage may be cathode voltage.

The common electrodes COM may be cylindrical electrodes without an open area. The common electrodes COM may be transparent electrodes for light emission in the subpixels SP.

Alternatively, the common electrodes COM may be mesh type electrodes each having several open areas. The open areas of the common electrodes COM may respectively correspond to light emitting areas (e.g., areas where some of anode electrodes are positioned) of the subpixels SP.

It is assumed in the following description that common electrodes COM, which function as touch electrodes, are electrodes that each form an electric field with the pixel electrode in each subpixel and are also used for display driving.

Accordingly, signals that are applied to the common electrodes COM may be touch driving signals TDS and also signals that are used for display driving.

Figure 5:
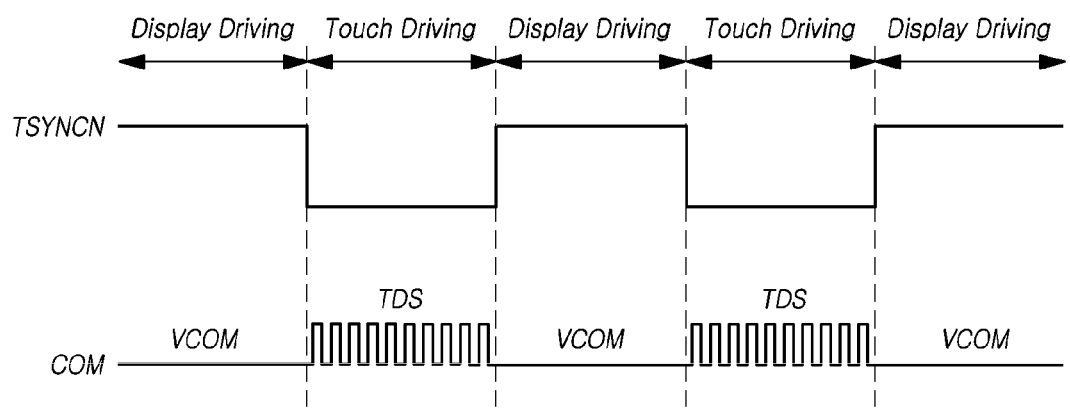
FIG. 5 is a diagram showing a time-division driving method by the touch display device according to an embodiment of the present disclosure.

FIG. 5 is a diagram showing a time-division driving method by the touch display device 100 according to an embodiment of the present disclosure.

Referring to FIG. 5, the touch display device 100 according to an embodiment of the present disclosure can time-divisionally perform display driving and touch driving. This type of driving method is called a time-division driving method.

The touch display device 100 according to an embodiment of the present disclosure can use a touch synchronization signal TSYNCN to discriminate a display driving period and a touch driving period.

For example, in a touch synchronization signal TSYNCN, a first level (e.g., a high level) may show the display driving period and a second level (e.g., a low level) may show the touch driving period.

During the touch driving period, all or some of common electrodes COM receive a touch driving signal TDS. During the display driving period, the common electrodes COM may be floated, may be grounded, or may receive specific DC voltage (e.g., VCOM).

When the common electrodes COM also functions as common electrodes for display driving, they can receive common voltage VCOM for display driving during the display driving period and receive a touch driving signal TDS during the touch driving period.

The touch driving signals TDS that are applied to the common electrodes COM during the touch driving period may be DC voltage, but may be signals of which the voltage levels change. When the touch driving signals TDS are signals of which the voltage levels are changed, they may be called modulation signals, pulse signals, or AC signals.

While a touch driving signal TDS is applied to a common electrode COM corresponding to a touch electrode during the touch driving period, the common electrode COM can generate parasitic capacitance with other surrounding electrodes. The parasitic capacitance may reduce touch sensitivity.

Accordingly, in the touch display device 100, while a touch driving signal TDS is applied to a common electrode COM that may be a touch electrode during the touch driving period, load-free driving signals may be applied to other electrodes around the common electrode COM.

The load-free driving signals may be touch driving signals TDS or may be signals of which one or more the frequency, phase, voltage polarity, and amplitude correspond to those of touch driving signals TDS.

The electrodes around the common electrode COM may be data lines, gate lines, or other common electrodes or may be all surrounding electrodes or signal lines.

While touch driving signals TDS are applied to a common electrode COM during the touch driving period, load-free driving signals may be applied to one or more data lines around the common electrode COM or to all data lines on the display panel DISP.

While a touch driving signal TDS is applied to a common electrode COM during the touch driving period, load-free driving signals may be applied to one or more gate lines around the common electrode COM or to all gate lines on the display panel DISP.

While a touch driving signal TDS is applied to a common electrode COM during the touch driving period, load-free driving signals may be applied to one or more common electrodes COM around the common electrode COM or to all the other common electrodes COM on the display panel DISP.

When the touch display device 100 according to an embodiment of the present disclosure is driven in a time-divisional method, it has to use a frame time divided into a display driving period and a touch driving period, with the display driving period being insufficient.

Due to insufficiency of the display driving period, a capacitor for image display (e.g., a capacitor between a pixel electrode and a common electrode) may not be sufficiently charged the necessary amount.

When the touch display device 100 according to an embodiment of the present disclosure is driven in a time-divisional method, not only the display driving time, but also the touch driving time is insufficient, so the touch sensing speed and accuracy may be deteriorated.

Accordingly, the touch display device 100 according to an embodiment of the present disclosure may simultaneously perform display driving and touch driving in driving methods other than the time-division driving method. This will be described with reference to FIG. 6.

Figure 6:
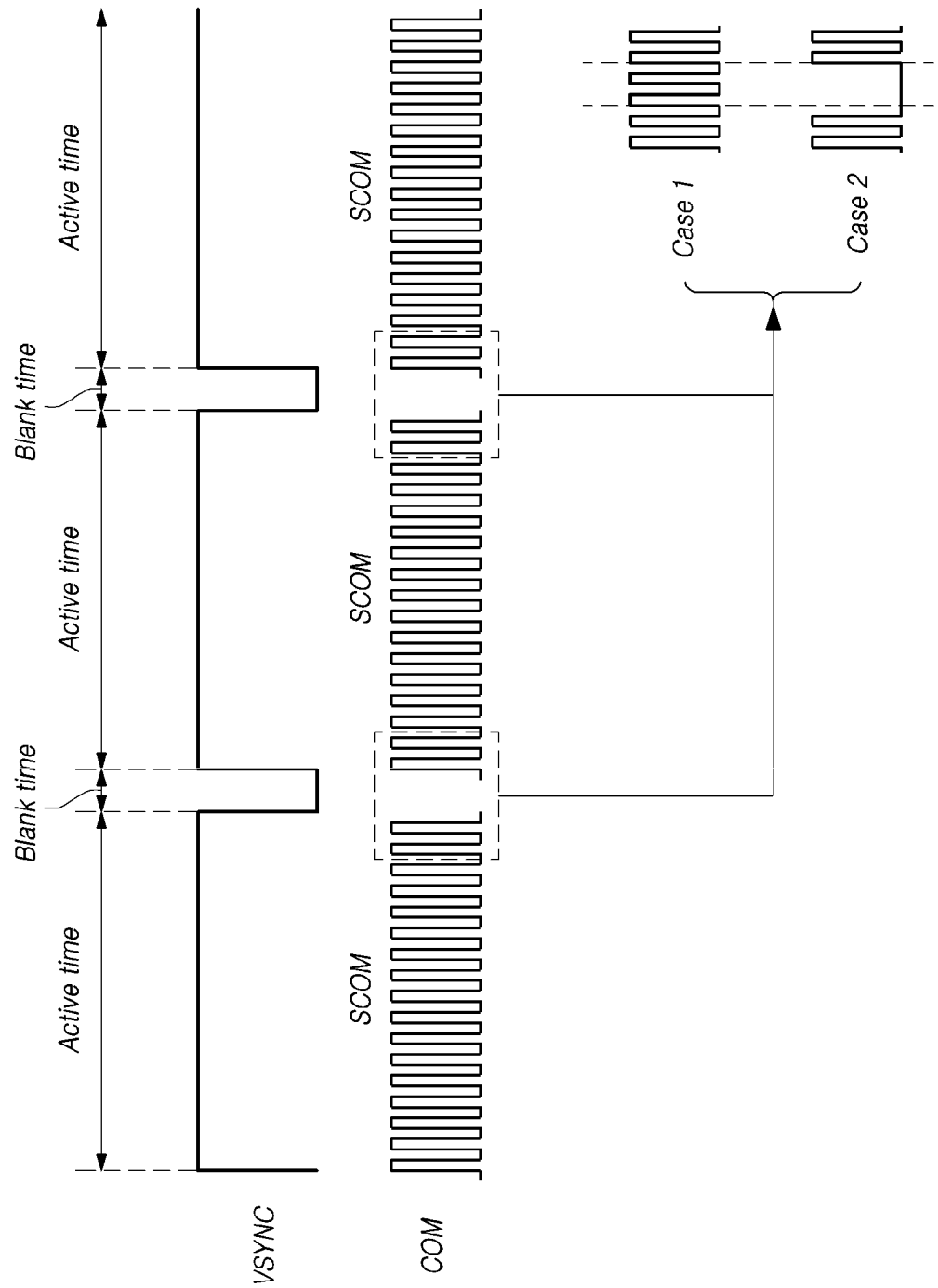
FIG. 6 is a diagram showing a time-free driving method by the touch display device according to an embodiment of the present disclosure.

FIG. 6 is a diagram showing a time-free driving method by the touch display device 100 according to an embodiment of the present disclosure.

Referring to FIG. 6, the touch display device 100 according to an embodiment of the present disclosure may simultaneously perform display driving and touch driving. This type of driving method is called TFD (Time Free Driving).

When the touch display device 100 according to an embodiment of the present disclosure is operated in the time-free driving method, a touch synchronization signal TSYNCN for discriminating a display driving period and a touch driving period may be needed.

Figure 7:
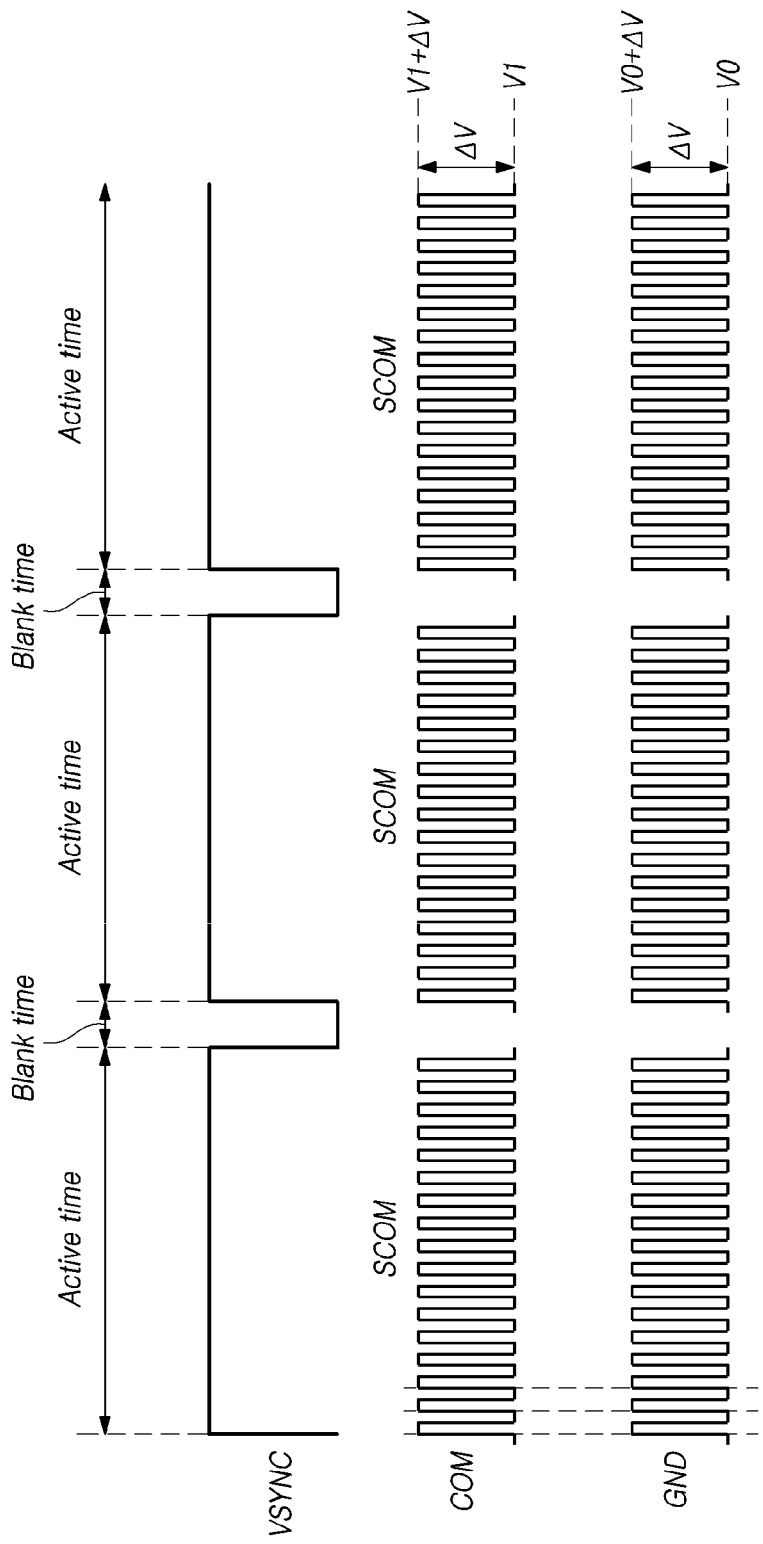
FIG. 7 is a diagram illustrating a time-free driving method and a ground modulation scheme by the touch display device according to an embodiment of the present disclosure.

Further, when the touch display device 100 according to an embodiment of the present disclosure is operated in the time-free driving method, a vertical synchronization signal VSYNC and/or a horizontal synchronization signal HSYNC for display driving may replace the touch synchronization signal TSYNCN. FIG. 7 shows an example in which a vertical synchronization signal VSYNC replaces a touch synchronization signal TSYNCN that defines a touch driving period.

When the touch display device 100 according to an embodiment of the present disclosure performs time-free driving, it can perform display driving and touch driving during an active time and a blank time that are defined by a vertical synchronization signal VSYNC. One active time may correspond to one display frame time.

Accordingly, when the touch display device 100 according to an embodiment of the present disclosure performs time-free driving, it can sequentially drive a plurality of gate lines GL for display driving and supply data voltage for image display to data lines DL, and can also supply common signals SCOM to a plurality of common electrodes COM for touch driving.

The common signals SCOM may be voltage signals for forming electric fields with pixel voltage of subpixels for display driving and also touch driving signals TDS for touch driving.

In this specification, a common signal SCOM, which is a signal of which the voltage level changes, is discriminated from a common voltage VCOM that is a DC voltage of which the voltage level is not changed.

As described above, when the touch display device 100 according to an embodiment of the present disclosure performs driving in the time-free driving method, it can sense touch by a finger and/or a pen while displaying images through display driving.

The touch display device 100 according to an embodiment of the present disclosure may simultaneously perform display driving and touch driving in all frame times (that is, all active times).

Alternatively, the touch display device 100 according to an embodiment of the present disclosure may perform only display driving in some frame times (active times) and simultaneously perform display driving and touch driving in some other frame times (active times), or, depending on cases, may perform only touch driving in some frame times (active times). In this case, a touch synchronization signal TSYNCN determining a touch driving period may be separately needed.

The touch display device 100 according to an embodiment of the present disclosure supplies common signals SCOM of which the voltage levels change to common electrodes COM during an active time and may supply common signals SCOM of which the voltage levels change to the common electrodes COM even during a blank time (Case 1).

Alternatively, the touch display device 100 according to an embodiment of the present disclosure may float the common electrode, supply a DC voltage, or supply a specific reference voltage (e.g., a ground voltage) during a blank time (Case 2). This can be applied to a case in which a blank time is used as a specific time for pen touch driving etc.

FIG. 7 is a diagram illustrating a time-free driving method and a ground modulation scheme by the touch display device 100 according to an embodiment of the present disclosure.

Referring to FIG. 7, in the touch display device 100 according to an embodiment of the present disclosure, when a common signal SCOM of which the voltage level changes is supplied to a touch electrode TE while display driving is performed (i.e., during an active time) the ground voltage GND of a ground to which the display panel DISP is connected may correspond to one or more of the frequency, phase, voltage polarity, and amplitude of the common signal SCOM.

Referring to the example of FIG. 7, while display driving and touch driving are simultaneously performed (i.e., during an active time), the ground voltage GND applied to the display panel DISP may have amplitude of $\Delta V$ and the voltage level thereof may change between V0 and V0+$\Delta V$. The ground voltage GND may correspond to secondary ground voltage GND2 to be described below.

The common signal SCOM that is applied to the touch electrode TE may have amplitude of $\Delta V$ and the voltage level thereof may change between V1 and V1+$\Delta V$.

According to the embodiment of FIG. 7, the ground voltage GND to which the display panel DISP is grounded and the common signal SCOM applied to the touch electrode TE may be the same in frequency, phase, and amplitude. However, when the voltage levels change, the high-level voltage and the low-level voltage may be the same (V0=V1) or may be different from each other (V0≠V1).

As shown in FIGS. 6 and 7, a vertical synchronization signal VSYNC can maintain a second level (e.g., a high level or a low level) during an active time and maintain a first level (e.g., a low level or a high level) during a blank time. In this case, the interval between first levels (e.g., low levels or high levels) can be defined as one display frame.

Alternatively, the vertical synchronization signal VSYNC can maintain the first level (e.g., a low level or a high level) during an active time and can maintain the second level (e.g., a high level or a low level) during a blank time. In this case, the interval between two pulses having the second level (e.g., a high level or a low level) can be defined as one display frame.

Figure 8:
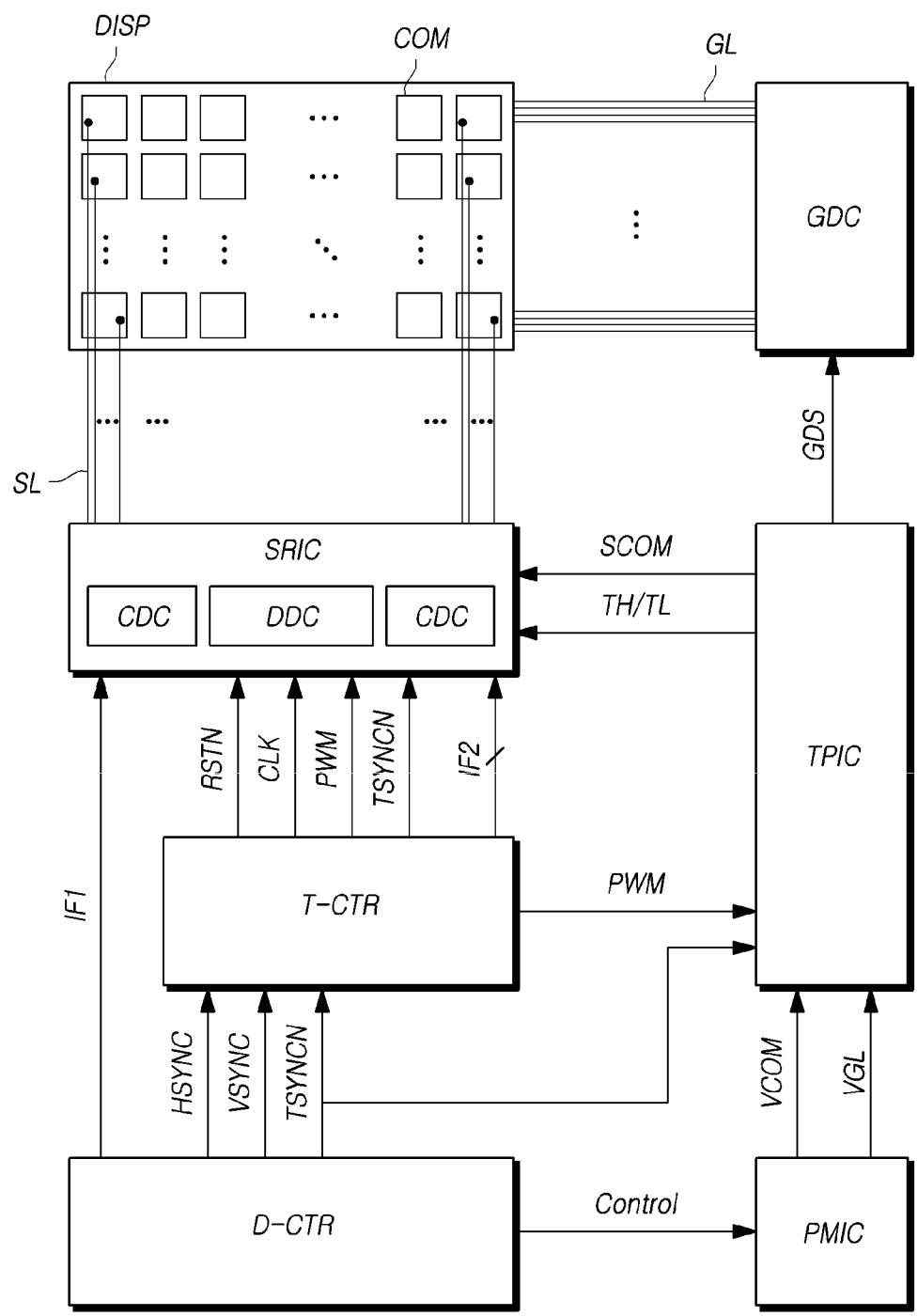
FIG. 8 is a diagram showing the entire system configuration of the touch display device according to an embodiment of the present disclosure.

FIG. 8 is a diagram schematically showing the entire system configuration of the touch display device 100 according to an embodiment of the present disclosure.

Referring to FIG. 8, a plurality of data lines DL disposed on the display panel DISP can be driven by one data driving circuit DDC and a plurality of common electrodes COM disposed on the display panel DISP can be driven by two common electrode driving circuits CDC.

This configuration is only an example and, the data lines DL disposed on the display panel DISP may be driven by two data driving circuits DDC and the common electrodes COM disposed on the display panel DISP may be driven by one common electrode driving circuit CDC.

Referring FIG. 8, one data driving circuit DDC and two common electrode driving circuits CDC may be implemented in one combined driving circuit SRIC that is an integrated circuit.

Referring to FIG. 8, a display controller D-CTR for controlling the operations of the data driving circuit DDC and the gate driving circuit GDC can provide a horizontal synchronization signal HSYNC, a vertical synchronization signal VSYNC, a touch synchronization signal TSYNCN, etc. to a touch controller T-CTR.

The touch controller T-CTR can provide a reset signal RSTN, a clock signal CLK, a pulse modulation signal (e.g., a pulse width modulation signal PWM), a touch synchronization signal TSYNCN, etc. to the combined driving circuit SRIC.

The display controller D-CTR can transmit/receive signals by communicating with the combined driving circuit SRIC through a first interface IF1.

The touch controller T-CTR can transmit/receive signals by communicating with the combined driving circuit SRIC through a second interface IF2.

Referring to FIG. 8, the touch display device 100 according to an embodiment of the present disclosure may include a power management integrated circuit PMIC and a touch power integrated circuit TPIC for supplying, controlling, or managing power.

The power management integrated circuit PMIC can be controlled by the display controller D-CTR.

The power management integrated circuit PMIC can provide common voltage VCOM and gate driving-related voltage (e.g., low-level gate voltage VGL) that are DC voltage to the touch power integrated circuit TPIC.

The touch controller T-CTR can supply a pulse modulation signal (e.g., a pulse width modulation signal PWM) to the touch power integrated circuit TPIC.

The display controller D-CTR can supply a touch synchronization signal TSYNCN to the touch power integrated circuit TPIC.

The touch power integrated circuit TPIC can generate and supply a common signal SCOM of a modulated signal type, to the combined driving circuit SRIC, using a pulse modulation signal (e.g., a pulse width modulation signal PWM) and a common voltage VCOM.

The touch power integrated circuit TPIC can generate and supply a common signal SCOM to the combined driving circuit SRIC at a timing defined by a touch synchronization signal TSYNCN.

The touch power integrated circuit TPIC can inform the combined driving circuit SRIC of high-level voltage TH and low-level voltage TL of a modulated common signal SCOM to inform it of the amplitude of the modulated common signal SCOM. Though described below, the touch power integrated circuit TPIC can inform the combined driving circuit SRIC of high-level voltage TH and low-level voltage TL of modulated secondary ground voltage GND2 to inform it of the amplitude of the modulated common signal SCOM.

The power management integrated circuit PMIC and the touch power integrated circuit TPIC may be implemented in one integrated circuit.

As described above, the touch power integrated circuit TPIC generates a common signal SCOM of a modulated signal type, using a pulse modulation signal (e.g., a pulse width modulation signal PWM) and common voltage VCOM, and it can use a ground modulation scheme when generating the common signal SCOM.

Figure 9:
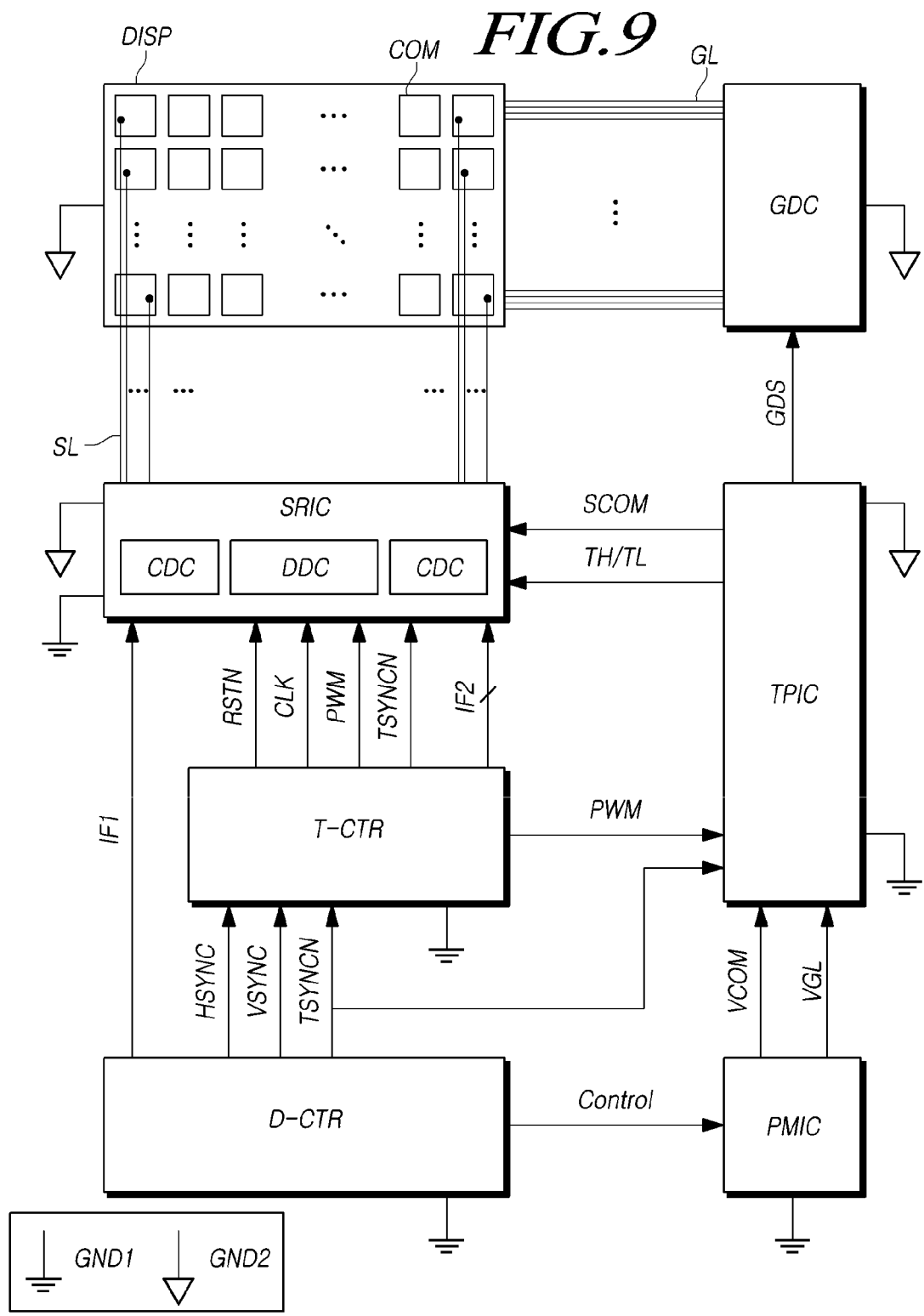
FIG. 9 is a diagram showing two ground voltages and a ground environment of the touch display device according to an embodiment of the present disclosure.
Figure 10:
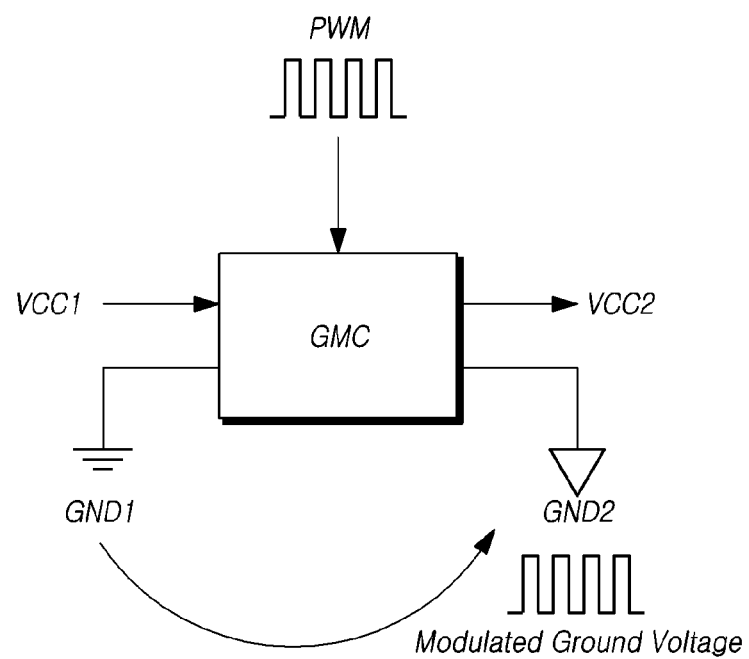
FIGS. 10 and 11 are diagrams showing a ground modulation circuit and a ground modulation scheme of the touch display device according to an embodiment of the present disclosure.
Figure 11:
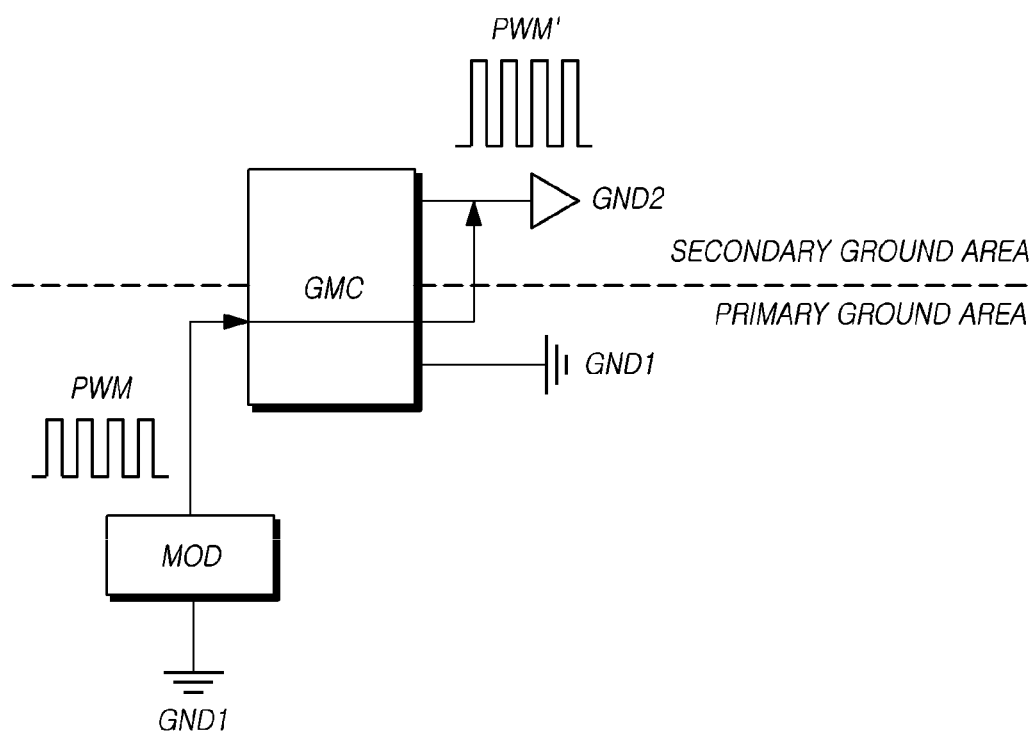

Ground modulation is briefly described hereafter with reference to FIGS. 9 to 11.

FIG. 9 is a diagram showing two ground voltages GND1 and GND2 and a ground environment of the touch display device 100 according to an embodiment of the present disclosure, and FIGS. 10 and 11 are diagrams showing a ground modulation circuit GMC and a ground modulation scheme of the touch display device 100 according to an embodiment of the present disclosure.

Referring to FIG. 9, the touch display device 100 according to an embodiment of the present disclosure can use two different ground voltages GND1 and GND2.

A primary ground corresponding to the primary ground voltage GND1 may be a ground line or a ground electrode disposed inside or outside the display panel DISP, or an external structure such as an outer cover of the display panel DISP, or a wire or an electrode disposed in the external structure. A secondary ground corresponding to the secondary ground voltage GND2 may be a ground line or a ground electrode disposed inside or outside the display panel DISP, or an external structure such as an outer cover of the display panel DISP, or a wire or an electrode disposed in the external structure.

In the touch display device 100 according to an embodiment of the present disclosure, the primary ground voltage GND1 can be applied to the display controller D-CTR, the touch controller T-CTR, and the power management integrated circuit PMIC.

The secondary ground voltage GND2 can be applied to the display panel DISP and the gate driving circuit GDC.

By grounding the display panel DISP to a secondary ground having the secondary ground voltage GND2 of a modulated signal type, all electrodes and signal lines such as the common electrodes COM, data lines DL, and gate lines GL in the display panel DISP can swing like the secondary ground voltage GND2, compared to the primary ground voltage GND1.

The primary ground voltage GND1 and the secondary ground voltage GND2 are different ground voltages, and one of the voltages may be a modulated signal type, compared to another one.

For example, the secondary ground voltage GND2 may be a modulated signal type, compared to the primary ground voltage GND1. On the contrary, the primary ground voltage GND1 may be a modulated signal type, compared to the secondary ground voltage GND2.

That is, any one of the primary ground voltage GND1 and the secondary ground voltage GND2 may be a DC voltage and the other one may be a modulated signal type.

The combined driving circuit SRIC should transmit/receive a signal to/from the display panel DISP grounded to the secondary ground voltage GND2 and transmit/receive signals to/from the display controller D-CTR and the touch controller T-CTR grounded to the primary ground voltage GND1, so it can be connected to both of the primary ground voltage GND1 and the secondary ground voltage GND2.

The touch power integrated circuit TPIC can be grounded to both of the primary ground voltage GND1 and the secondary ground voltage GND2.

Further, as described above, the touch power integrated circuit TPIC can generate a common signal SCOM of a modulated signal type, using a pulse modulation signal (e.g., a pulse width modulation signal PWM) input from the touch controller T-CTR and common voltage VCOM input from the power management integrated circuit PMIC.

Accordingly, the touch power integrated circuit TPIC may include a ground modulation circuit GMC shown in FIG. 10.

The ground modulation circuit GMC enables any one of the primary ground voltage GND1 and the secondary ground voltage GND2 to be modulated ground voltage (modulated signal), compared with the other one.

To this end, the ground modulation circuit can apply a modulation signal to the primary ground or the secondary ground.

The ground modulation circuit GMC can receive a pulse modulation signal (e.g., a pulse width modulation PWM), power voltage VCC1, and primary ground voltage GND1 and output modulated power voltage VCC2 and secondary ground voltage GND2.

As described above, the touch display device 100 can stably and simultaneously perform display driving and touch driving in the time-free driving method by using the two ground voltages GND1 and GND2.

Since the touch display device 100 simultaneously performs display driving and touch driving in the time-free driving method, data voltage can be applied to the data lines DL while common signals SCOM of a modulated signal type are applied to the common electrodes COM.

In this case, the common signals SCOM applied to the common electrodes COM can correspond to one or more of signal characteristics such as the frequency, phase, voltage polarity, and amplitude of the secondary ground voltage GND2 to which the display panel DISP is grounded.

Further, the data voltage applied to the data lines DL can also correspond to one or more of signal characteristics such as the frequency, phase, voltage polarity, and amplitude of the secondary ground voltage GND2 to which the display panel DISP is grounded. The data voltage may also be called a data signal.

Referring to FIG. 11, the touch display device 100 may further include a modulator MOD that outputs a reference modulation signal for ground modulation.

The ground modulation circuit GMC can apply a reference modulation signal (e.g., pulse width modulation PWM) output from the modulator MOD or a modulated signal (e.g., pulse width modulation PWM') obtained by amplifying the reference modulation signal to the primary ground GND1 or the secondary ground GND2.

Referring to FIG. 11, if the modulator MOD is grounded to the primary ground voltage GND1, the ground modulation circuit GMC can apply the reference modulation signal (e.g., pulse width modulation PWM) output from the modulator MOD or the modulated signal (e.g., pulse width modulation PWM) obtained by amplifying the reference modulation signal to the secondary ground. Accordingly, the secondary ground can be the secondary ground voltage GND2.

In this case, the modulator MOD, as shown in FIGS. 8 and 9, may be the touch controller T-CTR grounded to the primary ground voltage GND1.

The ground modulation circuit GMC may include a power separation circuit (not shown) for electrically separating the primary ground voltage GND1 and the secondary ground voltage GND2 from each other.

Accordingly, even if there are two ground voltages GND1 and GND2, the touch display device 100 can perform stable and normal driving operations without causing a problem with the driving operations due to the mix of the two ground voltages GND1 and GND2.

For example, the power separation circuit may include one or more of a transformer, a coupled inductor, and a converter. The converter, for example, may include one or more of a fly-back converter, a fly-buck converter, and a buck-boost converter.

The combined driving circuit SRIC should transmit/receive a signal to/from the display panel DISP grounded to the secondary ground voltage GND2 and transmit/receive signals to/from the display controller D-CTR and the touch controller T-CTR grounded to the primary ground voltage GND1, so it can be grounded to both of the primary ground voltage GND1 and the secondary ground voltage GND2.

In this case, the combined driving circuit SRIC may include a signal transmission circuit STC for transmission of signals between a part grounded to the primary ground voltage GND1 and a part grounded to the secondary ground voltage GND2.

The signal transmission circuit STC, for example, may be an opto coupler (O/C) or a digital isolator (D/I).

Figure 12:
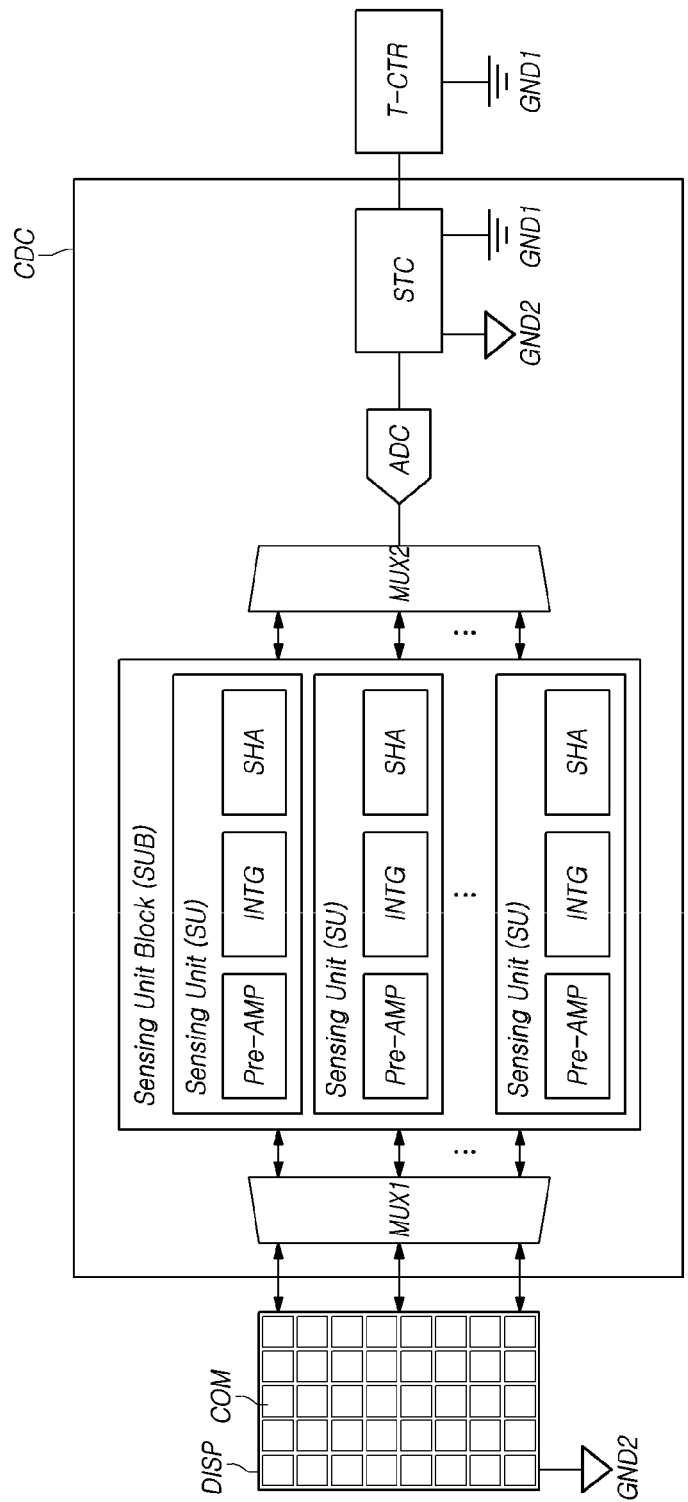
FIG. 12 is a diagram schematically showing a common electrode driving circuit of a touch display device according to an embodiment of the present disclosure.
Figure 13:
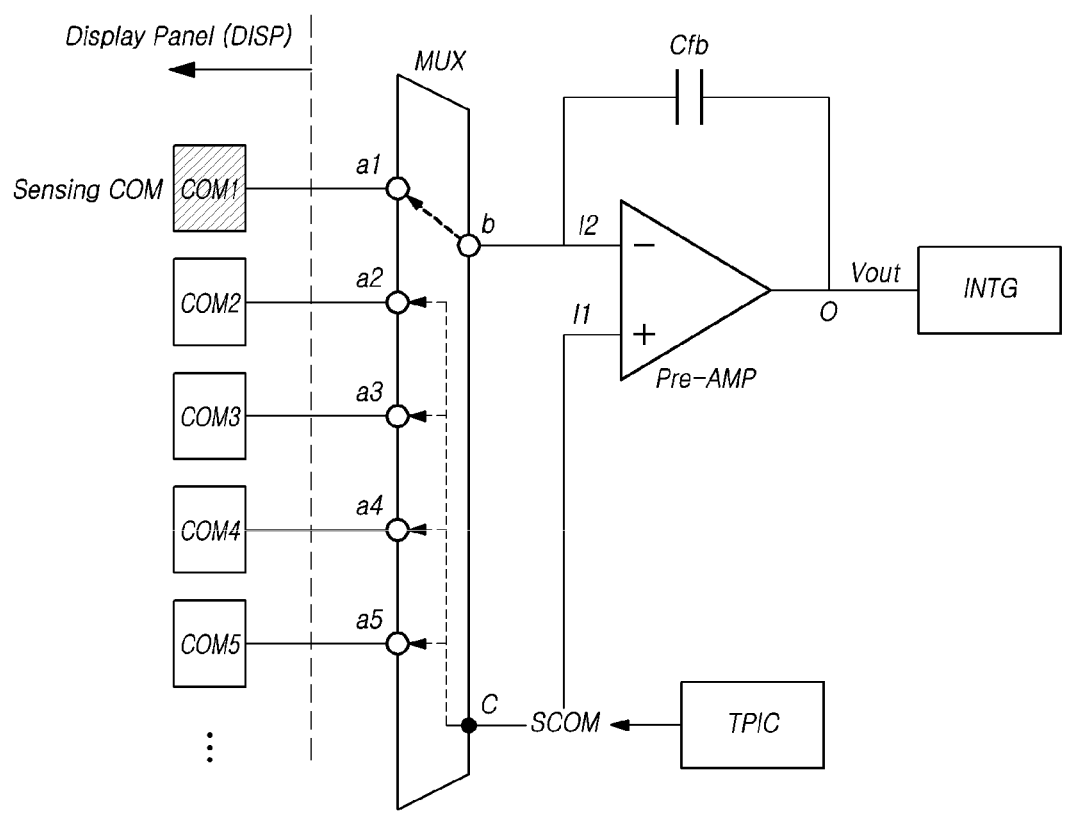
FIG. 13 is a diagram showing a fundamental method in which the common electrode driving circuit of the touch display device according to an embodiment of the present disclosure drives common electrode columns.

FIG. 12 is a diagram showing a common electrode driving circuit CDC of the touch display device 100 according to an embodiment of the present disclosure and FIG. 13 is a diagram showing a fundamental method in which the common electrode driving circuit CDC of the touch display device 100 according to an embodiment of the present disclosure drives common electrode columns.

Referring to FIG. 12, the common electrode driving circuit CDC according to an embodiment of the present disclosure may include a first multiplexer circuit MUX1, a sensing unit block SUB including a plurality of sensing units SU, a second multiplexer circuit MUX2, and an analog-to-digital converter ADC.

The first multiplexer circuit MUX1 may include one or more multiplexers. The second multiplexer circuit MUX2 may include one or more multiplexers. The first multiplexer circuit MUX1 can select the touch electrodes to be sensed among the plurality of touch electrodes and connect the selected touch electrodes to the plurality of sensing units SU. The second multiplexer circuit MUX2 may select one of the plurality of sensing units SU and connect the selected sensing unit to the analog-to-digital converter ADC.

The sensing units SU each may include a pre-amplifier Pre-AMP, an integrator INTG, and a sample and hold circuit SHA.

The pre-amplifier Pre-AMP can be electrically connected to one or more common electrodes COM.

The pre-amplifier Pre-AMP can receive a touch sensing signal from one common electrode, which is a sensing target, of one or two connectable common electrodes COM.

A more detailed example is described with reference to FIG. 13. The multiplexer MUX included in the first multiplexer circuit MUX1 connects one common electrode COM1, which is selected as a sensing target among several common electrodes COM1, COM2, COM3, COM4, COM5, . . . to the pre-amplifier Pre-AMP.

That is, the multiplexer MUX connects a node a1 connected to the common electrode COM1 that is a sensing target and a node b connected to the pre-amplifier Pre-AMP to each other.

Accordingly, the pre-amplifier Pre-AMP receives the common signal SCOM output from the touch power integrated circuit TPIC through a first input terminal I1 and then outputs it to a second input terminal I2.

The common signal SCOM output from the pre-amplifier Pre-AMP is supplied to the common electrode COM1 selected by the multiplexer MUX.

The multiplexer MUX connects nodes a2, a3, a4, a5, . . . connected to the other common electrodes COM2, COM3, COM4, COM5, . . . except for the sensing target common electrode COM1 of several connectable common electrodes COM1, COM2, COM3, COM4, COM5, . . . to a node c directly connected to the power management integrated circuit PMIC.

The other common electrodes COM2, COM3, COM4, COM5, . . . except for the sensing target common electrode COM1 of the connectable common electrodes COM1, COM2, COM3, COM4, COM5, . . . can be directly supplied with the common signal SCOM from the touch power integrated circuit TPIC not via the pre-amplifier Pre-AMP.

Thereafter, the pre-amplifier Pre-AMP can receive a touch sensing signal from the sensing target common electrode COM1.

A feedback capacitor Cfb is charged by the received touch sensing signal, and accordingly, a signal output to an output terminal 0 of the pre-amplifier Pre-AMP can be input to the integrator INTG.

The pre-amplifier Pre-AMP and the integrator INTG can be integrated.

The integrator INTG integrates a signal Vout output from the pre-amplifier Pre-AMP.

The analog-to-digital converter ADC can output touch sensing data obtained by converting the integrated value output from the integrator INTG into a digital value toward the touch controller T-CTR.

The analog-to-digital converter ADC can output the touch sensing data to the touch controller T-CTR grounded to the primary ground voltage GND1.

The pre-amplifier Pre-AMP can receive a touch sensing signal from a common electrode COM disposed on the display panel DISP grounded to the secondary ground voltage GND2.

The common electrode driving circuit CDC according to an embodiment of the present disclosure may further include a signal transmission circuit STC for signal transmission with the touch controller T-CTR.

The signal transmission circuit STC can be grounded to both of the primary ground voltage GND1 and the secondary ground voltage GND2.

Figure 14:
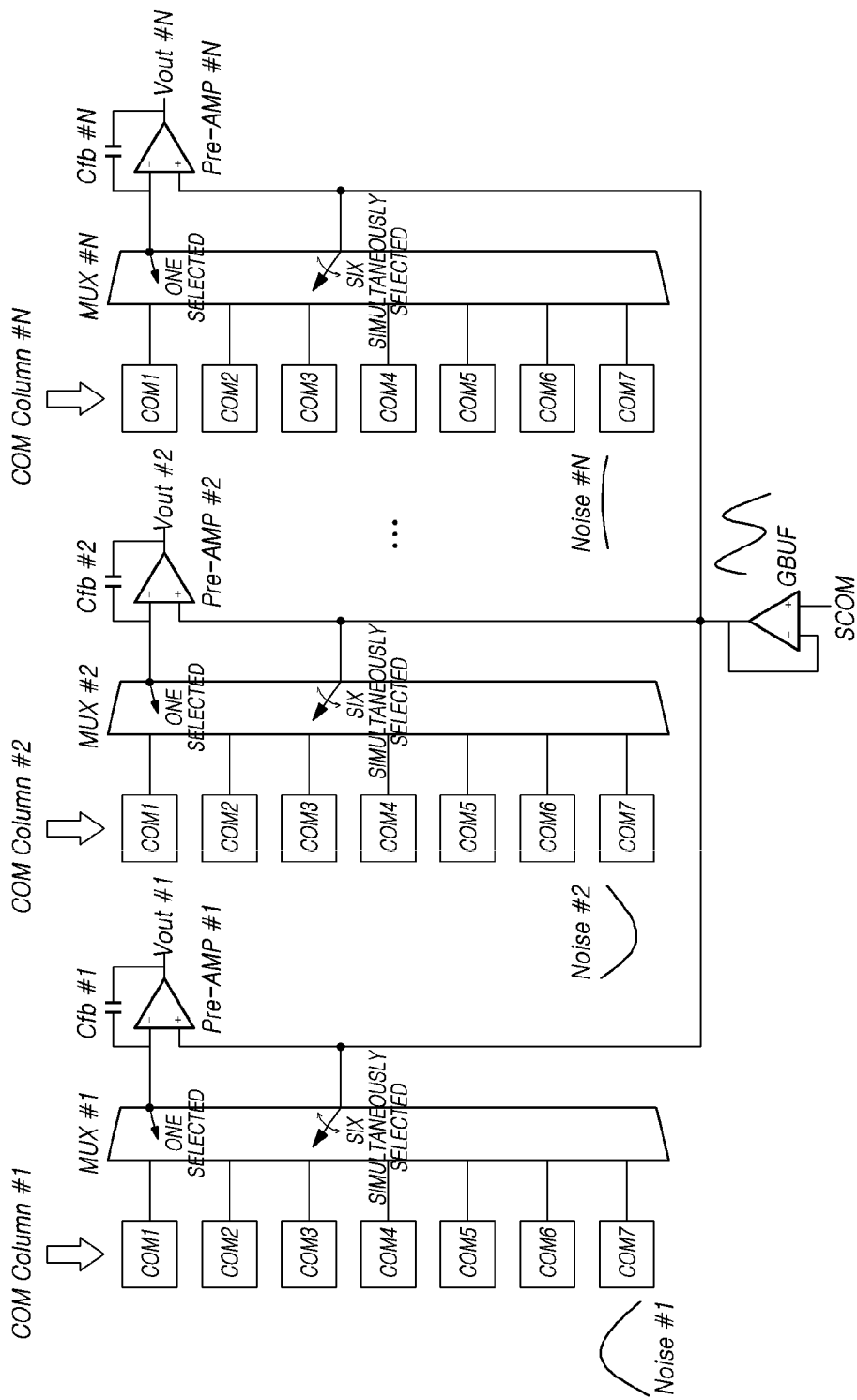
FIG. 14 is a diagram showing a global driving method that drives two or more common electrode columns, using a global buffer in the touch display device according to an embodiment of the present disclosure.
Figure 15:
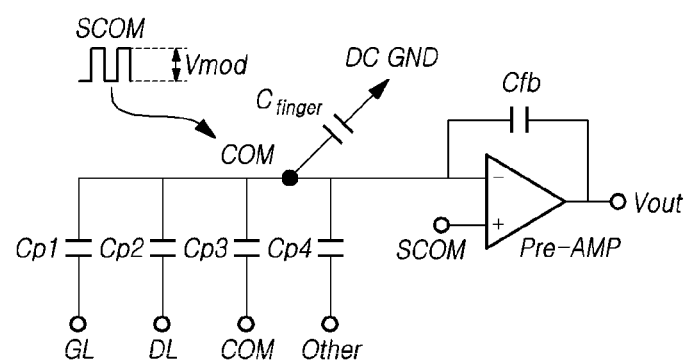
FIGS. 15 and 16 are diagrams showing a touch sensitivity reduction phenomenon according to the global driving method in the touch display device according to an embodiment of the present disclosure.
Figure 16:
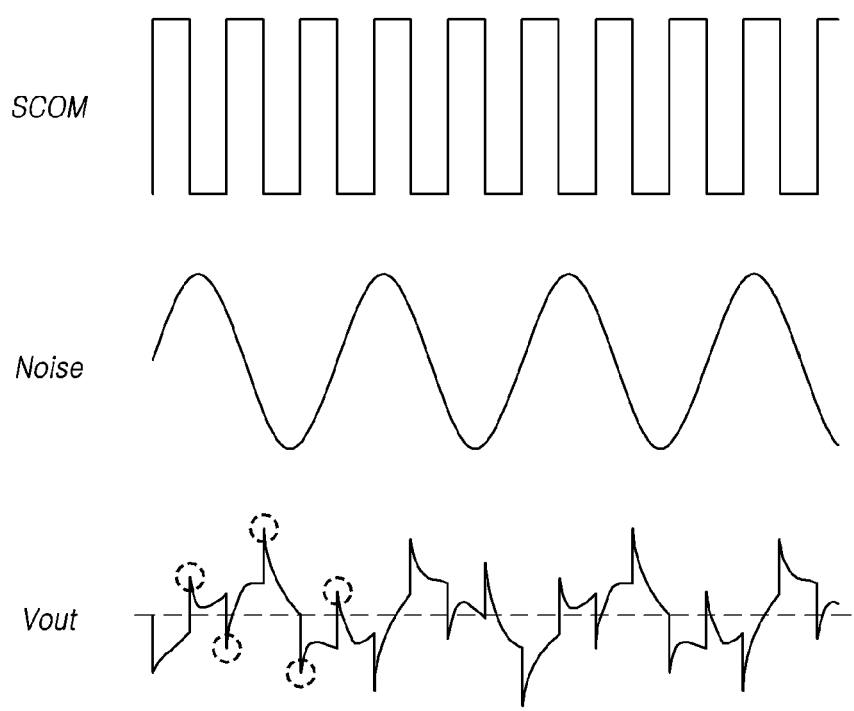

FIG. 14 is a diagram showing a global driving method that drives N common electrode columns COM Column #1~COM Column # N, using a global buffer GBUF in the touch display device 100 according to an embodiment of the present disclosure and FIGS. 15 and 16 are diagrams showing a touch sensitivity reduction phenomenon according to the global driving method in the touch display device 100 according to an embodiment of the present disclosure.

The global driving method stated herein means a driving method in which a common signal SCOM is output from one global buffer GBUF and the output common signal SCOM is supplied to all of N common electrode columns COM Column #1~COM Column # N, whereby display driving and touch driving are performed.

FIG. 14 exemplifies that N common electrode columns COM Column #1~COM Column # N each include seven common electrodes COM1~COM7 for the convenience of description.

A first common electrode column COM Column #1 is connected to a first multiplexer MUX #1 and a second common electrode column COM Column #2 is connected to a second multiplexer MUX #2. The N-th common electrode column COM Column # N is connected to an N-th multiplexer MUX # N. N, which indicates the number of common electrode columns, may be a natural number of 2 or more.

The operations of the N multiplexers MUX #1~MUX # N are the same as those described with reference to FIG. 13.

The common signal SCOM is output through the global buffer GBUF.

The common signal SCOM output from the global buffer GBUF is supplied to the N common electrode columns COM Column #1~COM Column # N.

The first multiplexer MUX #1 is connected to a first pre-amplifier Pre-AMP #1.

The first pre-amplifier Pre-AMP #1 has a non-inverting input terminal (+) connected to the output terminal of the global buffer GBUF, an inverting input terminal (−) connected to the first multiplexer MUX #1, and an output terminal for outputting an output signal Vout #1. A first feedback capacitor Cfb #1 exists between the inverting input terminal (−) and the output terminal of the first pre-amplifier Pre-AMP #1.

The common signal SCOM output from the global buffer GBUF is input to the non-inverting input terminal (+) of the first pre-amplifier Pre-AMP #1 and is also directly input to the first multiplexer MUX #1.

The common signal SCOM input to the non-inverting input terminal (+) of the first pre-amplifier Pre-AMP #1 can be output to the inverting input terminal (−).

The first multiplexer MUX #1 selects one of the seven common electrodes COM1~COM7 in the first common electrode column COM Column #1 as a sensing target and selects and short-circuits the other six common electrodes.

Accordingly, the first multiplexer MUX #1 receives the common signal SCOM output from the inverting input terminal (−) of the first pre-amplifier Pre-AMP #1 and supplies it to the common electrode selected as a sensing target. The first multiplexer MUX #1 simultaneously supplies the common signal SCOM output from the global buffer GBUF and directly input it, to the other six common electrodes.

The first pre-amplifier Pre-AMP #1 supplies a common signal SCOM to the common electrode selected as a sensing target through the first multiplexer MUX #1 and then can output an output signal Vout #1 according to a sensing signal received from the common electrode.

The second multiplexer MUX #2 is connected to a second pre-amplifier Pre-AMP #2.

The second pre-amplifier Pre-AMP #2 has a non-inverting input terminal (+) connected to the output terminal of the global buffer GBUF, an inverting input terminal (−) connected to the second multiplexer MUX #2, and an output terminal for outputting an output signal Vout #2. A second feedback capacitor Cfb #2 exists between the inverting input terminal (−) and the output terminal of the second pre-amplifier Pre-AMP #2.

The common signal SCOM output from the global buffer GBUF is input to the non-inverting input terminal (+) of the second pre-amplifier Pre-AMP #2 and is also directly input to the second multiplexer MUX #2.

The common signal SCOM input to the non-inverting input terminal (+) of the second pre-amplifier Pre-AMP #2 can be output to the inverting input terminal (−).

The second multiplexer MUX #2 selects one of the seven common electrodes COM1~COM7 in the second common electrode column COM Column #2 as a sensing target and selects and short-circuits the other six common electrodes.

Accordingly, the second multiplexer MUX #2 receives the common signal SCOM output from the inverting input terminal (−) of the second pre-amplifier Pre-AMP #2 and supplies it to the common electrode selected as a sensing target. The second multiplexer MUX #2 simultaneously supplies the common signal SCOM output from the global buffer GBUF and directly input it, to the other six common electrodes.

The second pre-amplifier Pre-AMP #2 supplies a common signal SCOM to the common electrode selected as a sensing target through the second multiplexer MUX #2 and then can output an output signal Vout #2 according to a sensing signal received from the common electrode.

The N-th multiplexer MUX # N is connected to an N-th pre-amplifier Pre-AMP # N.

The N-th pre-amplifier Pre-AMP # N has a non-inverting input terminal (+) connected to the output terminal of the global buffer GBUF, an inverting input terminal (−) connected to the N-th multiplexer MUX # N, and an output terminal for outputting an output signal Vout # N. An N-th feedback capacitor Cfb # N exists between the inverting input terminal (−) and the output terminal of the N-th pre-amplifier Pre-AMP # N.

The common signal SCOM output from the global buffer GBUF is input to the non-inverting input terminal (+) of the N-th pre-amplifier Pre-AMP # N and is also directly input to the N-th multiplexer MUX # N.

The common signal SCOM input to the non-inverting input terminal (+) of the N-th pre-amplifier Pre-AMP # N can be output to the inverting input terminal (−).

The N-th multiplexer MUX # N selects one of the seven common electrodes COM1~COM7 in the N-th common electrode column COM Column # N as a sensing target and selects and short-circuits the other six common electrodes.

Accordingly, the N-th multiplexer MUX # N receives the common signal SCOM output from the inverted input terminal (−) of the N-th pre-amplifier Pre-AMP # N and supplies it to the common electrode selected as a sensing target. The N-th multiplexer MUX # N simultaneously supplies the common signal SCOM output from the global buffer GBUF and directly input it, to the other six common electrodes.

The N-th pre-amplifier Pre-AMP # N supplies a common signal SCOM to the common electrode selected as a sensing target through the N-th multiplexer MUX # N and then can output an output signal Vout # N according to a sensing signal received from the common electrode.

As shown in FIG. 4, data lines DL are arranged in the direction of the common electrode columns.

In the time-free driving method, the first common electrode column COM Column #1 and two or more data lines DL overlapping the first common electrode column COM Column #1 are simultaneously driven.

Accordingly, a change (e.g., a voltage polarity change) of a data signal applied to the two or more data lines overlapping the first common electrode column COM Column #1 to display an image can act as a noise Noise #1 to the seven common electrodes COM1 COM7 in the first common electrode column COM Column #1.

Similarly, a change (e.g., a voltage polarity change) of a data signal applied to the two or more data lines overlapping the second common electrode column COM Column #2 to display an image can act as a noise Noise #2 to the seven common electrodes COM1 COM7 included in the second common electrode column COM Column #2. Further, a change (e.g., a voltage polarity change) of a data signal applied to the two or more data lines overlapping the N-th common electrode column COM Column # N to display an image can act as a noise Noise # N to the seven common electrodes COM1~COM7 included in the N-th common electrode column COM Column # N.

The noises Noise #1~Noise # N generated in the display driving electrodes such as the data lines DL may have the same frequency and amplitude characteristics in the direction of the common electrode columns.

The noises Noise #1~Noise # N generated in the N common electrode columns COM Column #1~COM Column # N may be different.

The noise Noise #1 generated in the first common electrode column COM Column #1 may influence the second common electrode column COM Column #2 and/or the N-th common electrode column COM Column # N.

Accordingly, a noise obtained by combining several noises Noise #1~Noise # N can be applied to common electrodes COM such as non-sensing target common electrodes, that is, noises different from the noise applied to the sensing target common electrode (the sensing node) can be input.

Referring to FIG. 15, parasitic capacitors Cp1, Cp2, Cp3, and Cp4 can be formed between the sensing target common electrode COM and a gate line GL, a data line DL, a common electrode COM, and a common electrode Other around the sensing target common electrode COM while a common signal SCOM swings with predetermined amplitude Vmod.

When voltage that is applied to one or more of the surrounding gate line GL, data line DL, common electrode COM, and common electrode Other rapidly changes, the amount of electricity of one or more of the parasitic capacitors Cp1, Cp2, Cp3, and Cp4 may rapidly change.

Accordingly, the amount of electricity that charges the feedback capacitor Cfb in association with the capacitor Cfinger between a touch input pointer (e.g., a finger) grounded to a DC ground DC GND and the sensing target common electrode COM, can rapidly change. That is, noise that influences the touch sensitivity may be generated. Accordingly, the output signal Vout from the pre-amplifier Pre-AMP may deteriorate the touch sensitivity or touch may not be sensed from the output signal Vout.

Referring to the example shown in FIG. 16, assuming that a common signal SCOM is a pulse modulation signal of a square wave, and for the convenience of description, a noise is a signal of a sine wave, peak values in the output signal Vout are not uniform, but random. That is, in the output signal Vout, some peaks are too high or too low, so the output signal Vout can have a waveform that makes touch sensing impossible.

An embodiment of the present disclosure can provide a local driving method to remove or reduce the touch sensitive reduction phenomenon in the global driving method.

The local driving method stated herein means a driving method in which common signals SCOM #1~SCOM # N are respectively supplied to N common electrode columns COM Column #1~COM Column # N through local buffers respectively provided for the N common electrode columns COM Column #1~COM Column # N, whereby display driving and touch driving are performed.

Figure 17:
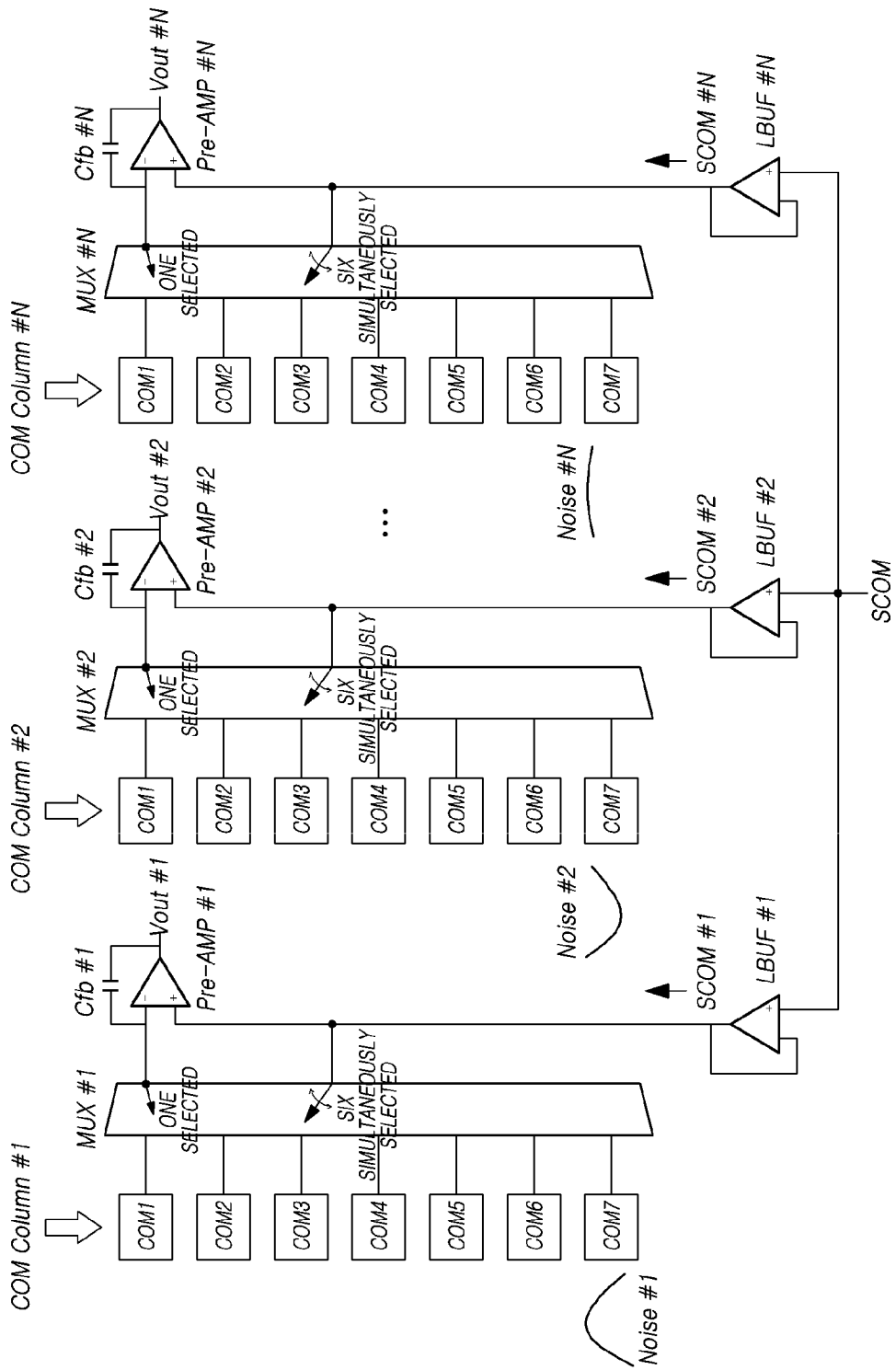
FIG. 17 is a diagram showing a local driving method of driving two or more common electrode columns, using local buffers respectively provided for the common electrode columns in the touch display device according to an embodiment of the present disclosure.
Figure 18:
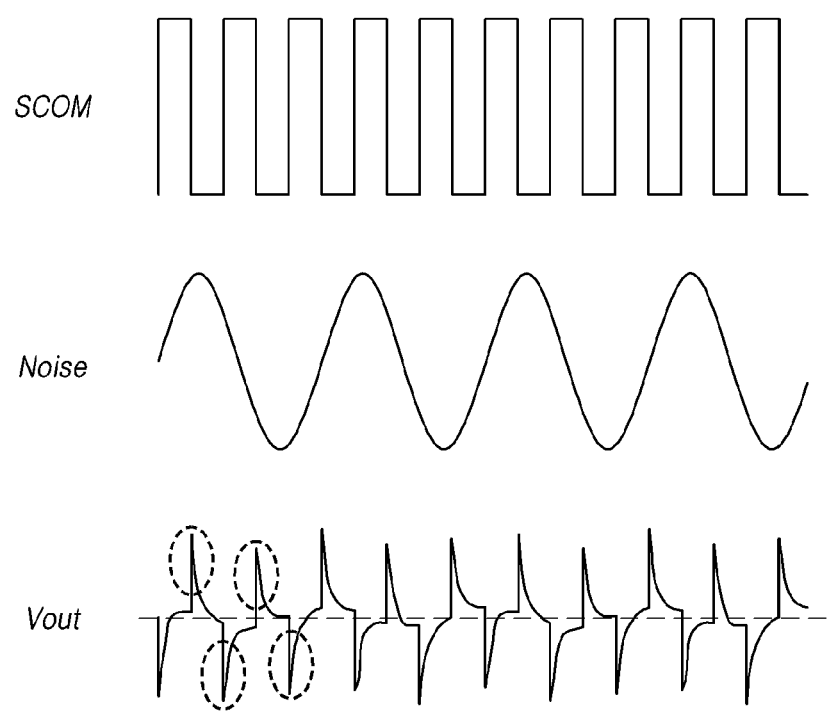
FIG. 18 is a diagram showing a touch sensitivity improvement phenomenon according to the local driving method in the touch display device according to an embodiment of the present disclosure.
Figure 19:
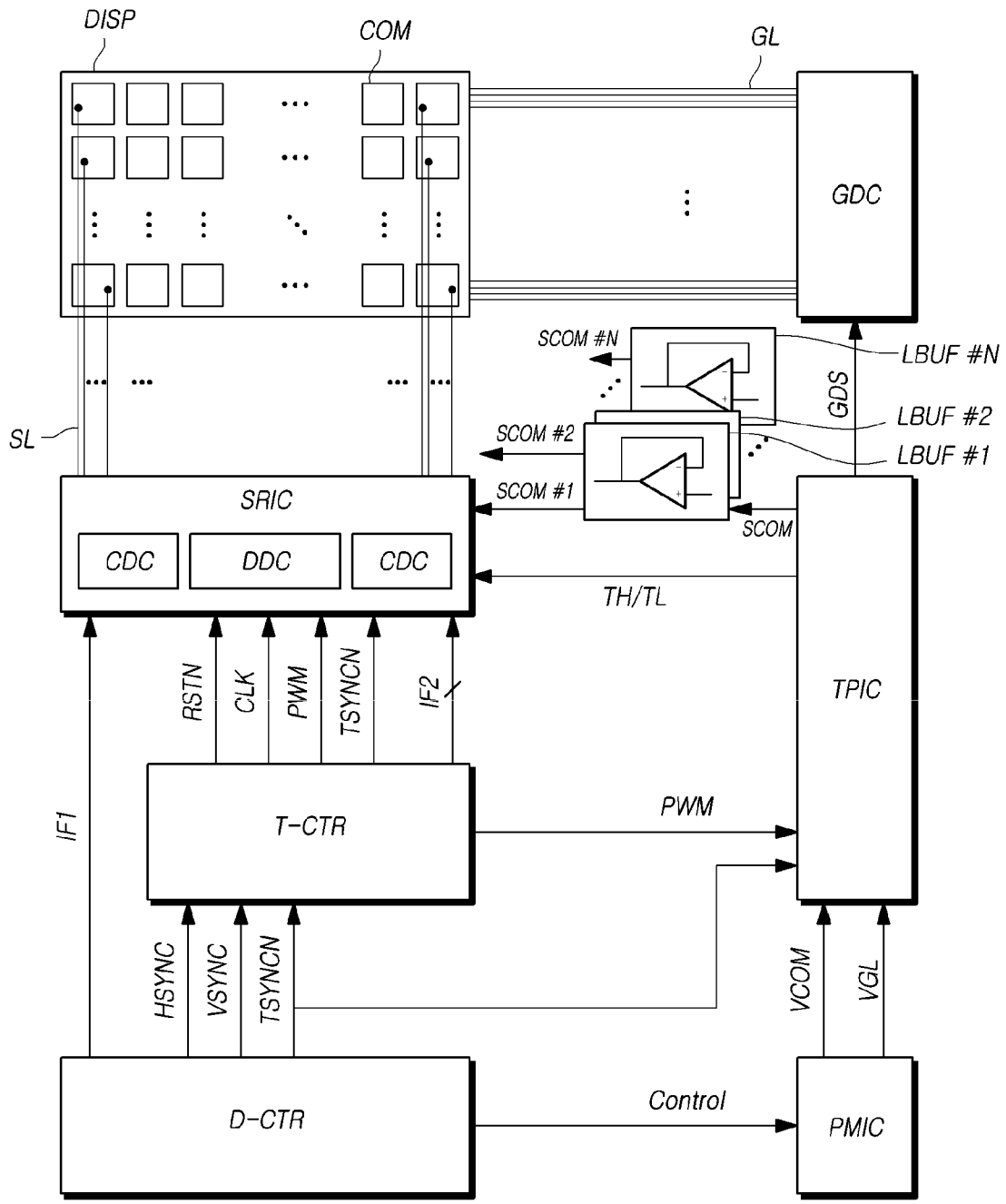
FIG. 19 is a diagram showing the entire system configuration of the touch display device to which the local driving method according to an embodiment of the present disclosure is applied.

FIG. 17 is a diagram showing a local driving method of driving N common electrode columns COM Column #1~COM Column # N, using local buffers LBUF #1~LBUF # N respectively provided for the common electrode columns and FIG. 18 is a diagram showing a touch sensitivity improvement phenomenon enabled by the local driving method in the touch display device 100 according to an embodiment of the present disclosure. FIG. 19 is a diagram showing the entire system configuration of the touch display device 100 to which the local driving method according to an embodiment of the present disclosure is applied.

FIG. 17 shows an example in which N common electrode columns COM Column #1~COM Column # N each include seven common electrodes COM1~COM7 for the convenience of description.

A first common electrode column COM Column #1 is connected to a first multiplexer MUX #1 and a second common electrode column COM Column #2 is connected to a second multiplexer MUX #2. The N-th common electrode column COM Column # N is connected to an N-th multiplexer MUX # N. N, which shows the number of common electrode columns, may be a natural number of 2 or more.

The operations of the N multiplexers MUX #1~MUX # N are the same as those described with reference to FIG. 13.

As shown in FIG. 17, there are local buffers LBUF #1~LBUF # N respectively corresponding to the N common electrode columns COM Column #1~COM Column # N.

That is, N local buffers LBUF #1~LBUF # N may include a first local buffer LBUF #1 corresponding to a first common electrode column COM Column #1, a second local buffer LBUF #2 corresponding to a second common electrode column COM Column #2, and an N-th local buffer LBUF # N corresponding to an N-th common electrode column COM Column # N.

A common electrode driving circuit CDC may include pre-amplifiers and multiplexers respectively for the N common electrode columns COM Column #1~COM Column # N.

For example, the common electrode driving circuit CDC may include: a first pre-amplifier Pre-AMP #1 that supplies a common signal SCOM #1 output from the first local buffer LBUF #1 to one common electrode (sensing target) of M (M=7) common electrodes COM1~COM7 in the first common electrode column COM Column #1 and receives a sensing signal from the common electrode; and a first multiplexer MUX #1 that supplies the common signal SCOM #1 output from the first local buffer LBUF #1 to the other common electrodes except for the common electrode (sensing target) of the M common electrodes COM1~COM7 in the first common electrode column COM Column #1.

The common electrode driving circuit CDC may include: a second pre-amplifier Pre-AMP #2 that supplies common signal SCOM #2 output from the second local buffer LBUF #2 to one common electrode (sensing target) of M (M=7) common electrodes COM1~COM7 in the second common electrode column COM Column #2 and receives a sensing signal from the common electrode; and a second multiplexer MUX #2 that supplies the common signal SCOM #2 output from the second local buffer LBUF #2 to the other common electrodes except for the common electrode (sensing target) of the M common electrodes COM1~COM7 in the second common electrode column COM Column #2.

The common electrode driving circuit CDC may include: an N-th pre-amplifier Pre-AMP # N that supplies common signal SCOM # N output from the N-th local buffer LBUF # N to one common electrode (sensing target) of M (M=7) common electrodes COM1~COM7 in the N-th common electrode column COM Column # N and receives a sensing signal from the common electrode; and an N-th multiplexer MUX # N that supplies the common signal SCOM # N output from the N-th local buffer LBUF # N to the other common electrodes except for the common electrode (sensing target) of the M common electrodes COM1~COM7 in the N-th common electrode column COM Column # N.

As described above, since N common electrode columns COM Column #1~COM Column # N are driven, while a common signal is applied to one common electrode that is a sensing target, the common signal is applied simultaneously to the other common electrodes, so it is possible to prevent parasitic capacitance from being formed between the common electrode that is a sensing target and the other common electrodes, whereby touch sensitivity can be improved.

The common signal SCOM is input to the N local buffers LBUF #1~LBUF # N. Common signals SCOM #1~SCOM # N are respectively output from the local buffers LBUF #1~LBUF # N.

That is, the N common electrode columns COM Column #1~COM Column # N can be supplied with the common signals SCOM #1~SCOM # N respectively through the local buffers LBUF #1~LBUF # N.

When the N local buffers LBUF #1~LBUF # N have the same output characteristic, the common signals SCOM #1~SCOM # N output from the N local buffers LBUF #1~LBUF # N may be the same.

In the time-free driving method, while data signals (which may be modulated data voltages) are supplied to a plurality of data lines, the N common electrode columns COM Column #1~COM Column # N can be supplied with the common signals SCOM #1~SCOM # N through the local buffers LBUF #1~LBUF # N.

The first multiplexer MUX #1 is connected to a first pre-amplifier Pre-AMP #1.

The first pre-amplifier Pre-AMP #1 has a non-inverting input terminal (+) connected to the output terminal of the first local buffer LBUF #1, an inverting input terminal (−) connected to the first multiplexer MUX #1, and an output terminal for outputting an output signal Vout #1. A first feedback capacitor Cfb #1 exists between the inverting input terminal (−) and the output terminal of the first pre-amplifier Pre-AMP #1.

The common signal SCOM #1 output from the first local buffer LBUF #1 is input to the non-inverting input terminal (+) of the first pre-amplifier Pre-AMP #1 and is also directly input to the first multiplexer MUX #1.

The common signal SCOM #1 input to the non-inverting input terminal (+) of the first pre-amplifier Pre-AMP #1 can be output to the inverting input terminal (−).

The first multiplexer MUX #1 selects one of the seven common electrodes COM1~COM7 in the first common electrode column COM Column #1 as a sensing target and selects and short-circuits the other six common electrodes.

Accordingly, the first multiplexer MUX #1 receives the common signal SCOM #1 output from the inverting input terminal (−) of the first pre-amplifier Pre-AMP #1 and supplies it to the common electrode selected as a sensing target. The first multiplexer MUX #1 simultaneously supplies the common signal SCOM #1 output from the first local buffer LBUF #1 and directly input it, to the other six common electrodes.

The first pre-amplifier Pre-AMP #1 supplies a common signal SCOM #1 to the common electrode selected as a sensing target through the first multiplexer MUX #1 and then can output an output signal Vout #1 according to a sensing signal received from the common electrode.

The second multiplexer MUX #2 is connected to a second pre-amplifier Pre-AMP #2.

The second pre-amplifier Pre-AMP #2 has a non-inverting input terminal (+) connected to the output terminal of the second local buffer LBUF #2, an inverting input terminal (−) connected to the second multiplexer MUX #2, and an output terminal for outputting an output signal Vout #2. A second feedback capacitor Cfb #2 exists between the inverting input terminal (−) and the output terminal of the second pre-amplifier Pre-AMP #2.

The common signal SCOM #2 output from the second local buffer LBUF #2 is input to the non-inverting input terminal (+) of the second pre-amplifier Pre-AMP #2 and is also directly input to the second multiplexer MUX #2.

The common signal SCOM #2 input to the non-inverting input terminal (+) of the second pre-amplifier Pre-AMP #2 can be output to the inverting input terminal (−).

The second multiplexer MUX #2 selects one of the seven common electrodes COM1~COM7 in the second common electrode column COM Column #2 as a sensing target and selects and short-circuits the other six common electrodes.

Accordingly, the second multiplexer MUX #2 receives the common signal SCOM #2 output from the inverting input terminal (−) of the second pre-amplifier Pre-AMP #2 and supplies it to the common electrode selected as a sensing target. The second multiplexer MUX #2 simultaneously supplies the common signal SCOM #2 output from the second local buffer LBUF #2 and directly input it, to the other six common electrodes.

The second pre-amplifier Pre-AMP #2 supplies a common signal SCOM #2 to the common electrode selected as a sensing target through the second multiplexer MUX #2 and then can output an output signal Vout #2 according to a sensing signal received from the common electrode.

The N-th multiplexer MUX # N is connected to an N-th pre-amplifier Pre-AMP # N.

The N-th pre-amplifier Pre-AMP # N has a non-inverting input terminal (+) connected to the output terminal of the N-th local buffer LBUF # N, an inverting input terminal (−) connected to the N-th multiplexer MUX # N, and an output terminal for outputting an output signal Vout # N. An N-th feedback capacitor Cfb # N exists between the inverting input terminal (−) and the output terminal of the N-th pre-amplifier Pre-AMP # N.

The common signal SCOM # N output from the N-th local buffer LBUF # N is input to the non-inverting input terminal (+) of the N-th pre-amplifier Pre-AMP # N and is also directly input to the N-th multiplexer MUX # N.

The common signal SCOM # N input to the non-inverting input terminal (+) of the N-th pre-amplifier Pre-AMP # N can be output to the inverting input terminal (−).

The N-th multiplexer MUX # N selects one of the seven common electrodes COM1~COM7 in the N-th common electrode column COM Column # N as a sensing target and selects and short-circuits the other six common electrodes.

Accordingly, the N-th multiplexer MUX # N receives the common signal SCOM # N output from the inverting input terminal (−) of the N-th pre-amplifier Pre-AMP # N and supplies it to the common electrode selected as a sensing target. The N-th multiplexer MUX # N simultaneously supplies the common signal SCOM # N output from the N-th local buffer LBUF # N and directly inputs it, to the other six common electrodes.

The N-th pre-amplifier Pre-AMP # N supplies a common signal SCOM # N to the common electrode selected as a sensing target through the N-th multiplexer MUX # N and then can output an output signal Vout # N according to a sensing signal received from the common electrode.

As described above, the N local buffers LBUF #1~LBUF # N and the N common electrode columns COM Column #1~COM Column # N correspond to each other and the N common electrode columns COM Column #1~COM Column # N are supplied with common signals through corresponding local buffers, so the common electrode columns are electrically separated by the corresponding local buffers. That is, the N common electrode columns COM Column #1~COM Column # N do not electrically influence each other.

Meanwhile, since the N common electrode columns COM Column #1~COM Column # N are supplied with common signals through the corresponding local buffers while data lines are driven to display an image, the common electrode columns are electrically separated by the corresponding local buffers. That is, the N common electrode columns COM Column #1~COM Column # N do not electrically influence each other. Accordingly, it is possible to prevent noises generated in the common electrode columns due to a display change from transferring to other common electrode columns.

Accordingly, it is possible to prevent a phenomenon that the output signals Vout #1~Vout # N from the pre-amplifiers Pre-AMP #1~Pre-AMP # N are excessively increased or decreased, whereby they are saturated up to a level at which touch sensing is impossible.

Accordingly, the feedback capacitors Cfb #1~Cfb # N can be designed to be small in the pre-amplifiers Pre-AMP #1~Pre-AMP # N. Therefore, it is possible to reduce the size of the integrated circuit IC including the common electrode driving circuit CDC.

Furthermore, since the N local buffers LBUF #1~LBUF # N are respectively provided for the N common electrode columns COM Column #1~COM Column # N, the ability to drive the common electrodes COM can be improved.

Referring to the example shown in FIG. 18, assuming that a common signal SCOM is a pulse modulation signal of a square wave, and for the convenience of description, a noise is a signal of a sine wave, peak values in the output signal Vout are uniform. That is, in the output signal Vout, all peaks are uniformly large or small, so output signal Vout can have a waveform that enables touch sensing. In other words, noise is removed, so that touch can be accurately detected (sensed) through output signal Vout.

An embodiment of the present disclosure can provide a local driving method to remove or reduce the touch sensitive reduction phenomenon in the global driving method.

Referring to FIG. 19, N local buffers LBUF #1~LBUF # N corresponding to N common electrode columns COM Column #1~COM Column # N may be included in a common electrode driving circuit CDC.

The N local buffers LBUF #1~LBUF # N corresponding to N common electrode columns COM Column #1~COM Column # N may be included in a combined driving circuit SRIC.

For example, the output terminals of the N local buffers LBUF #1~LBUF # N may be respectively connected to non-inverted input terminals of N pre-amplifiers Pre-AMP #1~Pre-AMP # N corresponding to the N common electrode columns COM Column #1~COM Column # N.

According to the above description, when N local buffers LBUF #1~LBUF # N are included in a driving circuit, it is possible to reduce noise due to a display change, using the driving circuit without specific parts.

Referring to FIG. 19, a touch power integrated circuit TPIC can output a common signal SCOM modulated in response to an input pulse signal PWM and common voltage VCOM to N local buffers LBUF #1~LBUF # N corresponding to the N common electrode columns COM Column #1~COM Column # N.

Compared with the common voltage VCOM, the common signal SCOM may be a modulated signal of which the voltage level changes. For example, the common voltage VCOM may be DC voltage and the common signal SCOM may be a signal of which the voltage level changes as time passes. The signal of which the voltage level changes as time passes may be referred to as a modulated signal, an AC signal, or a pulse signal.

According to the above description, it is possible to simultaneously display an image and sense touch by supplying a common signal SCOM of a modulated signal type to common electrodes COM through the touch power integrated circuit TPIC.

Referring to FIG. 19, the N local buffers LBUF #1~LBUF # N corresponding to N common electrode columns COM Column #1~COM Column # N may be included in the touch power integrated circuit TPIC.

Alternatively, the N local buffers LBUF #1 LBUF # N corresponding to N common electrode columns COM Column #1~COM Column # N may be disposed between the touch power integrated circuit TPIC and the common electrode driving circuit CDC.

As described above, when the N local buffers LBUF #1~LBUF # N are included in the touch power integrated circuit TPIC, it is possible to reduce noise due to a display change, using the touch power integrated circuit TPIC without specific parts. When the N local buffers LBUF #1~LBUF # N are disposed between the touch power integrated circuit TPIC and the common electrode driving circuit CDC, it is not required to correct the touch power integrated circuit TPIC and the common electrode driving circuit CDC.

Referring to FIG. 19, the touch power integrated circuit TPIC can provide information about the amplitude of a modulated common signal SCOM and a modulated secondary ground voltage GND2 to the common electrode driving circuit CDC.

To this end, the touch power integrated circuit TPIC can inform the common electrode driving circuit CDC of high-level voltage TH and low-level voltage TL of the modulated common signal SCOM or the modulated secondary ground voltage GND2.

Accordingly, the common electrode driving circuit CDC can effectively drive and sense the common electrodes COM disposed on the display panel DISP.

Referring to FIG. 19, the touch power integrated circuit TPIC can output a gate driving-related signal GDS of a modulated signal type to a gate driving circuit GDC in response to an input pulse modulation signal (e.g., pulse width modulation PWM) and gate driving-related voltage (e.g., low-level gate voltage VGL).

Compared with the gate driving-related voltage (e.g., low-level gate voltage VGL), the gate driving-related signal GDS may be a modulated signal of which the voltage level is changed.

Accordingly, a scan signal supplied to gate lines GL in the gate driving circuit GDC may correspond, in frequency, amplitude, etc., to the common signals SCOM applied to the common electrodes COM.

Accordingly, it is possible to prevent unnecessary parasitic capacitance from being formed between the gate lines GL and the common electrodes COM and it is also possible to improve the touch sensitivity and display ability.

Referring to FIG. 19, a primary ground voltage GND1 may be applied to a touch controller T-CTR and a secondary ground voltage GND2 different from the primary ground voltage GND1 may be applied to the data driving circuit DDC and the common electrode driving circuit CDC.

Accordingly, a ground environment suitable for the characteristics of parts can be provided.

Referring to FIG. 19, the primary ground voltage GND1 and the secondary ground voltage GND2 are relative to each other. For example, compared with the primary ground voltage GND1 (if the primary ground voltage GND1 is DC voltage), the secondary ground voltage GND2 and the common signal SCOM may be modulated signals.

A display panel DISP is grounded to the secondary ground voltage GND2 that is a modulated signal type, the secondary ground voltage GND2 to which the display panel DISP is grounded and the common signal SCOM applied to the common electrodes COM disposed on the display panel DISP may be modulated signals of which one or more of the frequency, phase, voltage polarity, and amplitude correspond to each other.

According to the grounding environment of the display panel DISP, the common signal SCOM that is applied to the common electrodes COM disposed on the display panel DISP swings, similar to the secondary ground voltage GND2 to which the display panel DISP is grounded, whereby touch driving can be effectively performed.

Compared with the primary ground voltage GND1 (if the primary ground voltage GND1 is DC voltage), the secondary ground voltage GND2 and a data signal may be modulated signals.

The secondary ground voltage GND2 and the data signal may correspond to each other in frequency, phase, voltage polarity, and amplitude.

Accordingly, data signals that are supplied to data lines DL may correspond, in frequency, amplitude, etc., to the common signals SCOM applied to the common electrodes COM.

Accordingly, it is possible to prevent unnecessary parasitic capacitance from being formed between the data lines DL and the common electrodes COM and it is also possible to improve the touch sensitivity and display ability.

Meanwhile, the primary ground voltage GND1 and the secondary ground voltage GND2 are relative to each other. Accordingly, compared with the secondary ground voltage GND2 (if the secondary ground voltage GND2 is DC voltage), the primary ground voltage GND1 may be shown as a modulated signal. In this case, the common signal SCOM may be the same type as the primary ground voltage GND1.

In terms of a driving circuit, the secondary ground voltage GND2 that is applied to the display panel DISP can be applied in the same way to a driving circuit SRIC.

Accordingly, the driving circuit SRIC and the display panel DISP have the same ground environment, so the driving circuit SRIC can effectively drive the display panel DISP.

Figure 20:
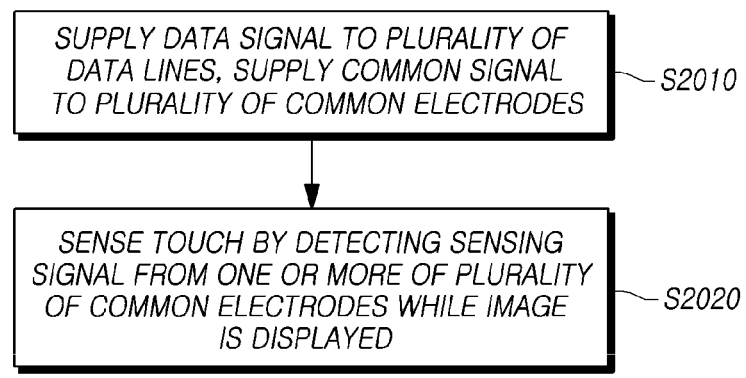
FIG. 20 is a flowchart showing a method of driving the touch display device according to an embodiment of the present disclosure.

FIG. 20 is a flowchart showing a method of driving the touch display device 100 according to an embodiment of the present disclosure.

Referring to FIG. 20, the method of driving the touch display device 100 according to an embodiment of the present disclosure may include: supplying a data signal to a plurality of data lines DL and supplying a common signal SCOM to a plurality of common electrodes COM (S2010); and sensing touch by detecting sensing signals from one or more of a plurality of common electrodes COM while an image is displayed (S2020).

A plurality of common electrodes disposed on a display panel DISP is arranged in N common electrode columns COM COLUMN #1~COM COLUMN # N, and the N common electrode columns COM COLUMN #1~COM COLUMN # N each may include M common electrodes COM.

While a data signal is supplied to the data lines DL, the N common electrode columns COM Column #1~COM Column # N can be supplied with a common signal SCOM respectively through local buffers LBUF #1~LBUF # N.

According to the driving method, noise due to data change for display driving is reduced, so touch sensing ability can be improved and display ability can also be improved.

According to the present disclosure, as described above, it is possible to provide a touch display device 100, a driving circuit, and a driving method that prevent deterioration of touch sensitivity due to display driving.

According to the present disclosure, it is possible to provide a touch display device 100, a driving circuit, and a driving method that can reduce noise due to a display change (e.g., a change in data voltage).

According to the present disclosure, it is possible to provide a touch display device 100, a driving circuit, and a driving method that prevent noise due to a display change (e.g., a change in data voltage) that may cause touch electrode columns from influencing each other.

According to the present disclosure, as described above, it is possible to provide a touch display device 100, a driving circuit, and a driving method that can simultaneously perform display driving and touch driving.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch display device comprising:
   a display panel having a plurality of data lines and a plurality of gate lines, and a plurality of common electrodes arranged in at least M rows and N columns;
   a data driving circuit supplying a data signal to the data lines;
   a common electrode driving circuit supplying a common signal to the common electrodes and outputting sensing data by detecting sensing signals from one or more of the common electrodes; and
   a touch controller sensing touch on a basis of the sensing data,
   wherein the common electrodes disposed on the display panel are arranged in N (N is a natural number of 2 or more) common electrode columns and the N common electrode columns each comprise M (M is a natural number of 2 or more) common electrodes, and
   while the data signal is supplied to the data lines, the N common electrode columns are supplied with the common signal respectively through local buffers,
   wherein the N common electrode columns comprise a first common electrode column and a second common electrode column and the local buffers comprise a first local buffer corresponding to the first common electrode column and a second local buffer corresponding to the second common electrode column, and
   the common electrode driving circuit comprises:
   a pre-amplifier supplying a common signal output from the first local buffer to one common electrode of the M common electrodes included in the first common electrode column, and receiving a sensing signal from the one common electrode; and
   a multiplexer supplying the common signal output from the first local buffer to other common electrodes except for the one common electrode of the M common electrodes included in the first common electrode column.

2. The touch display device of claim 1, wherein the common electrode driving circuit comprises local buffers respectively corresponding to the N common electrode columns.

3. The touch display device of claim 1, further comprising a touch power integrated circuit outputting the common signal to N local buffers corresponding to the N common electrode columns in response to an input pulse signal and common voltage,
   wherein the common signal is a modulated signal of which a voltage level changes, compared to the common voltage.

4. The touch display device of claim 3, wherein the local buffers respectively corresponding to the N common electrode columns are included in the touch power integrated circuit or disposed between the touch power integrated circuit and the common electrode driving circuit.

5. The touch display device of claim 3, wherein the touch power integrated circuit provides information about an amplitude of the common signal to the common electrode driving circuit.

6. The touch display device of claim 3, wherein the touch power integrated circuit outputs a gate driving-related signal to the data driving circuit in response to an input pulse modulation signal and a gate driving-related voltage, and
   the gate driving-related signal is a modulated signal of which a voltage level changes, compared to the gate driving-related voltage.

7. The touch display device of claim 1, wherein a primary ground voltage is applied to the touch controller, and
   a secondary ground voltage different from the primary ground voltage is applied to the display panel, the data driving circuit, and the common electrode driving circuit.

8. The touch display device of claim 7, wherein the secondary ground voltage and the common signal are modulated signals, compared to the primary ground voltage, and
   the secondary ground voltage and the common signal are modulated signals corresponding to each other in one or more of frequency, phase, voltage polarity, and amplitude.

9. The touch display device of claim 1, wherein the data driving circuit and the common electrode driving circuit are included in one integrated circuit.

10. A driving circuit configured to drive a display panel that has a plurality of data lines and a plurality of gate lines, and a plurality of common electrodes arranged in at least M rows and N columns and in which N (N is a natural number of 2 or more) common electrode columns constituting the common electrodes each comprise M (M is a natural number of 2 or more) common electrodes, the driving circuit comprising:
   a data driving circuit supplying a data signal to the data lines; and
   a common electrode driving circuit supplying a common signal to the common electrodes and outputting sensing data by detecting sensing signals from one or more of the common electrodes,
   wherein while the data signal is supplied to the data lines, the N common electrode columns are supplied with the common signal respectively through local buffers,
   wherein the N common electrode columns comprise a first common electrode column and a second common electrode column,
   a first local buffer is provided for the first common electrode column and a second local buffer is provided for the second common electrode column, and the common electrode driving circuit comprises:
a pre-amplifier supplying a common signal output from the first local buffer to one common electrode of the M common electrodes included in the first common electrode column, and receiving a sensing signal from the one common electrode; and
a multiplexer supplying the common signal output from the first local buffer to other common electrodes except for the one common electrode of the M common electrodes included in the first common electrode column.

11. The driving circuit of claim 10, comprising local buffers respectively corresponding to the N common electrode columns.

12. The driving circuit of claim 10, wherein a ground voltage is applied to the display panel, and
the ground voltage is a modulated signal of which a voltage level changes, compared to DC ground voltage.

13. The driving circuit of claim 12, wherein the common signal is a modulated signal corresponding to the ground voltage in one or more of frequency, phase, voltage polarity, and amplitude.

14. A touch display device comprising:
a display panel having a plurality of touch electrodes arranged in at least M rows and N columns;
a driving circuit supplying a touch driving signal to the touch electrodes and outputting sensing data by detecting sensing signals from one or more of the touch electrodes: and
a touch controller sensing touch on a basis of the sensing data,
wherein the touch electrodes disposed on the display panel are arranged in N (N is a natural number of 2 or more) touch electrode columns and the N touch electrode columns each comprise M (M is a natural number of 2 or more) touch electrodes, and
the N touch electrode columns are supplied with the touch driving signal through respectively local buffers,
wherein the N touch electrode columns comprise a first touch electrode column and a second touch electrode column and the local buffers comprise a first local buffer corresponding to the first touch electrode column and a second local buffer corresponding to the second touch electrode column, and
the driving circuit comprises:
a pre-amplifier supplying a touch driving signal output from the first local buffer to one touch electrode of the M touch electrodes included in the first touch electrode column, and receiving a sensing signal from the one touch electrode; and
a multiplexer supplying the touch driving signal output from the first local buffer to other touch electrodes except for the one touch electrode of the M touch electrodes included in the first touch electrode column.

15. A method of driving a touch display device comprising a display panel having a plurality of data lines and a plurality of gate lines, and a plurality of common electrodes arranged in at least M rows and N columns, the method comprising:
supplying a data signal to the data lines and supplying a common signal to the common electrodes; and
sensing touch by detecting sensing signals from one or more of the common electrodes while an image is displayed,
wherein the common electrodes disposed on the display panel are arranged in N (N is a natural number of 2 or more) common electrode columns and the N common electrode columns each comprise M (M is a natural number of 2 or more) common electrodes, and
while the data signal is supplied to the data lines, the N common electrode columns are supplied with the common signal respectively through local buffers,
wherein the N common electrode columns comprise a first common electrode column and a second common electrode column and the local buffers comprise a first local buffer corresponding to the first common electrode column and a second local buffer corresponding to the second common electrode column,
wherein through a pre-amplifier, a common signal output from the first local buffer is supplied to one common electrode of the M common electrodes included in the first common electrode column, and a sensing signal from the one common electrode is received by the pre-amplifier, and
wherein through a multiplexer, the common signal output from the first local buffer is supplied to other common electrodes except for the one common electrode of the M common electrodes included in the first common electrode column.

* * * * *